US007536340B2

(12) United States Patent
Dheer et al.

(10) Patent No.: US 7,536,340 B2
(45) Date of Patent: May 19, 2009

(54) COMPLIANCE MONITORING METHOD AND APPARATUS

(75) Inventors: Sanjeev Dheer, Scarsdale, NY (US); Jeremy N. Sokolic, New York, NY (US)

(73) Assignee: CashEdge, Inc., New York, NY (US)

( * ) Notice: Subject to any disclaimer, the term of this patent is extended or adjusted under 35 U.S.C. 154(b) by 1066 days.

(21) Appl. No.: 10/739,892

(22) Filed: Dec. 18, 2003

(65) Prior Publication Data

US 2005/0187862 A1    Aug. 25, 2005

Related U.S. Application Data

(63) Continuation-in-part of application No. 10/134,046, filed on Apr. 26, 2002, which is a continuation-in-part of application No. 09/621,946, filed on Jul. 24, 2000, and a continuation-in-part of application No. 10/040,314, filed on Jan. 3, 2002, now Pat. No. 7,013,310.

(51) Int. Cl.
*G06Q 40/00*    (2006.01)
(52) U.S. Cl. .............................. 705/37; 705/38; 705/36; 705/35
(58) Field of Classification Search .................... 705/38, 705/37, 36, 35
See application file for complete search history.

(56) References Cited

U.S. PATENT DOCUMENTS

| 4,346,442 | A | 8/1982 | Musmanno |
|---|---|---|---|
| 4,694,397 | A | 9/1987 | Grant et al. |
| 5,481,720 | A | 1/1996 | Loucks et al. |
| 5,644,727 | A | 7/1997 | Atkins |
| 5,745,706 | A | 4/1998 | Wolfberg et al. |
| 5,787,427 | A | 7/1998 | Benantar et al. |
| 5,805,719 | A | 9/1998 | Pare et al. |
| 5,826,243 | A | 10/1998 | Musmanno et al. |
| 5,855,020 | A | 12/1998 | Kirsch |
| 5,884,285 | A | 3/1999 | Atkins |
| 5,893,078 | A | 4/1999 | Paulson |
| 5,895,838 | A | 4/1999 | Harjunmaa et al. |
| 5,940,809 | A | 8/1999 | Musmanno et al. |
| 6,012,048 | A | 1/2000 | Gustin et al. |

(Continued)

FOREIGN PATENT DOCUMENTS

GB    2392262    2/2004

(Continued)

OTHER PUBLICATIONS

Latest EPA Developments PR Newswire. New York: Jul. 21, 2000. p. 10.*

(Continued)

*Primary Examiner*—Frantzy Poinvil
*Assistant Examiner*—Clement Graham
(74) *Attorney, Agent, or Firm*—Courtney Staniford & Gregory LLP

(57) ABSTRACT

A compliance monitoring system and method identifies an individual or entity to be monitored for account compliance and receives account information associated with the individual or entity. The compliance monitoring system and method obtains holdings in the account and determines whether the holdings in the account comply with a predetermined rule.

34 Claims, 24 Drawing Sheets

U.S. PATENT DOCUMENTS

| | | | |
|---|---|---|---|
| 6,018,722 | A | 1/2000 | Ray et al. |
| 6,021,397 | A * | 2/2000 | Jones et al. ............... 705/36 R |
| 6,038,603 | A | 3/2000 | Joseph |
| 6,058,378 | A | 5/2000 | Clark et al. |
| 6,108,641 | A | 8/2000 | Kenna et al. |
| 6,108,788 | A | 8/2000 | Moses et al. |
| 6,199,077 | B1 | 3/2001 | Inala et al. |
| 6,226,623 | B1 | 5/2001 | Schein et al. |
| 6,240,399 | B1 | 5/2001 | Frank et al. |
| 6,317,783 | B1 | 11/2001 | Freishtat et al. |
| 6,321,334 | B1 | 11/2001 | Jerger et al. |
| 6,324,523 | B1 | 11/2001 | Killeen, Jr. et al. |
| 6,374,231 | B1 | 4/2002 | Bent et al. |
| 6,381,592 | B1 | 4/2002 | Reuning |
| 6,405,245 | B1 | 6/2002 | Burson et al. |
| 6,412,073 | B1 | 6/2002 | Rangan |
| 6,473,800 | B1 | 10/2002 | Jerger et al. |
| 6,484,151 | B1 * | 11/2002 | O'Shaughnessy ......... 705/36 R |
| 6,510,451 | B2 | 1/2003 | Wu et al. |
| 6,513,019 | B2 | 1/2003 | Lewis |
| 6,567,850 | B1 | 5/2003 | Freishtat et al. |
| 6,594,766 | B2 | 7/2003 | Rangan et al. |
| 6,598,028 | B1 | 7/2003 | Sullivan et al. |
| 6,606,606 | B2 | 8/2003 | Starr |
| 6,609,128 | B1 | 8/2003 | Underwood |
| 6,633,910 | B1 | 10/2003 | Rajan |
| 6,697,860 | B1 | 2/2004 | Kung |
| 6,721,716 | B1 | 4/2004 | Gross |
| 6,792,082 | B1 | 9/2004 | Levin |
| 6,799,167 | B1 | 9/2004 | Gullen et al. |
| 6,802,042 | B2 | 10/2004 | Rangan et al. |
| 7,013,310 | B2 | 3/2006 | Messing et al. |
| 7,031,939 | B1 | 4/2006 | Gallagher |
| 2001/0042785 | A1 * | 11/2001 | Walker et al. ............... 235/379 |
| 2002/0010768 | A1 | 1/2002 | Marks et al. |
| 2002/0019753 | A1 | 2/2002 | Boden |
| 2004/0117302 | A1 * | 6/2004 | Weichert et al. .............. 705/40 |
| 2006/0015450 | A1 | 1/2006 | Guck et al. |

FOREIGN PATENT DOCUMENTS

| | | |
|---|---|---|
| JP | 10149404 A | 6/1998 |
| WO | WO 97-19406 | 5/1997 |
| WO | WO 01-88674 A2 | 11/2001 |

OTHER PUBLICATIONS

Dartmouth Research & Consulting Glossaries, 2000 (pp. 1-9).

Bruce Schneier, Applied Cryptography, Second Edition, Protocols, Algorithms, and Source Code in C, pp. 30-32.

* cited by examiner

| Financial Institution Name | ABA and Routing Info | Internet URL | Account Offerings | Acct Type | Account Interest Rate | Minimum Account Balance |
|---|---|---|---|---|---|---|
| Bank of America | xxxxxxxx xxxxxxxxx | www.bofa.com | Savings | Asset | 2.00 | Min. 200.00 |
| | | | Non-Intereset Checking | Asset | 0.00 | Min. 100.00 |
| | | | Interest Checking | Asset | 1.50 | Min. 1000.00 |
| | | | CD - 3 Months | Asset | 5.00 | Min. 500.00 |
| | | | Home Equity | Debt | 12.50 | N/A |
| | | | Credit Card | Debt | 18.00 | N/A |
| | | | Overdraft Protection | Debt | 16.00 | N/A |
| Charles Schwab | xxxxxxxx xxxxxxxxx | www.schwab.com | Money Market | Asset | 4.75 | Min. 2000.00 |
| | | | ABC Mutual Fund | Asset | N/A | Min. 1000.00 |
| ... | ... | ... | ... | ... | ... | ... |

| Customer Name | Financial Institution | Account Number, Username, P/W | Active Accounts | Account Balance | User Preferences |
|---|---|---|---|---|---|
| John Smith | Bank of America | xxxxxxxxx xxxxxxx xxxxxx | Savings | 2208.63 | Make all recommendations; Maintain minimum balance of $1500 in Interest Checking; Do not transfer more than $4000 per week; Pay down Overdraft Protection first; Do not withdraw funds from Rainbow Credit Union Savings account. |
| | Bank of America | xxxxxxxxx xxxxxxx xxxxxx | Intereset Checking | 4126.87 | |
| | Bank of America | xxxxxxxxx xxxxxxx xxxxxx | Home Equity | 12,240.32 | |
| | Bank of America | xxxxxxxxx xxxxxxx xxxxxx | Credit Card | 3,566.45 | |
| | Bank of America | xxxxxxxxx xxxxxxx xxxxxx | Overdraft Protection | 821.54 | |
| | Charles Schwab | xxxxxxxxx xxxxxxx xxxxxx | Money Market | 3628.94 | |
| | Rainbow Credit Union | xxxxxxxxx xxxxxxx xxxxxx | Savings | 562.34 | |
| Jane Doe | Bank One | xxxxxxxxx xxxxxxx xxxxxx | Savings | 261.79 | Do not recommend opening new accounts. |
| | Bank One | xxxxxxxxx xxxxxxx xxxxxx | Non-Interest Checking | 8245.21 | |
| . . . | . . . | . . . | . . . | . . . | . . . |

| Accounts | Employees | Search | Utilities | Define Search |

Employee Overview

United States Dollar USD

Jeremy S   Edit   <Home FI Account Number>:123456   Primary <Compliance Administrator>: Joe Compliance Administrator

[Update All]   [Employee Intervention]   [Manage Compliance Administrators]

Positions

| Position | Description | Quantity | Value | Last Updated |
|---|---|---|---|---|
| AOL | AOL Time Warner | 100.00 | $2,802.00 | 1 day ago |
| INTC | Intel | 100.00 | $3,305.00 | 2 days ago |
| NOK | Nokia Sponsored ADR | 50.00 | $1,176.00 | 3 hours ago |
| Cash and Other Money Markets | | | $100,000,000.00 | 14 minutes ago |
| Total | | | $100,007,283.00 | |

*Fig. 23*

Securities Position

| Symbol | Quantity | Currency | Price | Value | Name |
|---|---|---|---|---|---|
| MBNEQ | 20.000 | USD | $0.00 | $0.01 | CENTURA SOFTWARE CORPORATION |
| CSCO | 5.000 | USD | $16.41 | $82.05 | CISCO SYSTEMS INC |
| C | 5.000 | USD | $41.02 | $205.10 | CITIGROUP INC |
| C | 5.000 | USD | $41.02 | $205.10 | CITIGROUP INC |
| DELL | 3.000 | USD | $31.37 | $94.11 | DELL COMPUTER CORP |
| 345397NK5 | 1,000.000 | USD | $1.03 | $1,032.68 | FORD MOTOR CREDIT CO NOTES B/E |
| AOL | 11.000 | USD | $15.22 | $167.42 | AOL TIME WARNER |
| OHP | 5.000 | USD | $37.03 | $185.15 | OXFORD HEALTH PLANS INC COM |

Transaction History

From: May 23 2003    To: May 30 2003    [View Transactions]

| Date | Symbol | Action | Quantity | Currency | Price | Commission | Amount | Description |
|---|---|---|---|---|---|---|---|---|
| 05/30/2003 | NA | INT | 0.000 | USD | NA | NA | $0.63 | .256% 35 DAYS, BAL= 2568 |
| 05/23/2003 | C | INCOME-DIV | 0.000 | USD | NA | NA | $1.00 | NA |
| 05/23/2003 | C | INCOME-DIV | 0.000 | USD | NA | NA | $1.00 | NA |

*Fig. 24*

| Accounts | Employees | Search | Utilities | Define Search |
| --- | --- | --- | --- | --- |
| >> Search Status | Historical Searches | | | |

Search Status
Click on the search name to view detailed results

| Search | Status | Status | Last Executed |
| --- | --- | --- | --- |
| Purchase of a security that is part of an Initial Public Offering | Run Now | Clear | 6:00 AM March 24, 2003 |
| Balance search on margin accounts in excess of $10,000 | Run Now | Clear | 6:00 AM March 24, 2003 |
| Purchase or sale of a security over $25,000 | Run Now | Flagged | 6:00 AM March 24, 2003 |
| Purchase or sale of security over 5,000 shares | Run Now | Clear | 6:00 AM March 24, 2003 |
| Purchase or sale of security under $1.00 per share and quantity over 25,000 shares | Run Now | Clear | 6:00 AM March 24, 2003 |
| Purchase or sale of LNC stock | Run Now | Flagged | 6:00 AM March 24, 2003 |

*Fig. 25*

| Accounts | Employees | Search | Utilities | Define Search |
| --- | --- | --- | --- | --- |
| >> Search Status | Historical Searches | | | |

Search Result: Purchase or sale of a security over $25,000
Click employee name to see employee profile
Click Security to view transaction details
Click on a user action to execute and log activity

| Employee | Security | Transaction Date | Amount | Actions |
| --- | --- | --- | --- | --- |
| John S | AOL | 03/23/2003 | $ 50,000 | Email Alert   Insert Comment |
| Michael S | DELL | 03/26/2003 | $ 26,000 | Email Alert   Insert Comment |
| Patrick E | MSFT | 03/24/2003 | $ 50,000 | Email Alert   Insert Comment |

*Fig. 26*

COMPLIANCE MONITORING METHOD AND APPARATUS

RELATED APPLICATIONS

This application is a continuation-in-part of co-pending application Ser. No. 10/134,046, filed Apr. 26, 2002, entitled "Method and Apparatus for Delegating Authority", and incorporated herein by reference; the application having Ser. No. 10/134,046 is a continuation-in-part of co-pending application Ser. No. 09/621,946, filed Jul. 24, 2000, entitled "Method and Apparatus for Analyzing Financial Data", and a continuation-in-part of application Ser. No. 10/040,314, filed Jan. 3, 2002 now U.S. Pat. No. 7,013,310, entitled "Method and Apparatus for Retrieving and Processing Data", both of which are incorporated herein by reference.

TECHNICAL FIELD

The present invention relates to the handling of data and, more particularly, to monitoring compliance of an individual or entity with various rules or regulations.

BACKGROUND

Certain entities, such as financial institutions, are required to follow various rules and regulations. Further, an entity may be required to ensure that employees of the entity are complying with rules and regulations regarding insider trading, trading in restricted securities, timing of trades, and the size of trades. For example, the SEC and NASD set forth various regulations for employees of financial institutions or related organizations. Additionally, employers may voluntarily impose additional rules or restrictions on employees. In the case of a financial institution (e.g., a bank, saving and loan institution, credit union, mortgage company, lending company, or stock broker), employees may be restricted from investing in the stock of a customer, restricted to trading a customer's stock in certain situations, or restricted in the amount that can be invested in a customer's stock. In the case of an investment advisor, the advisor may be restricted from trading securities ahead of client trades (e.g., front running).

Existing systems for monitoring compliance with these types of rules and regulations require a considerable amount of manual work, such as manually reviewing account statements provided to employees by third party financial institutions (e.g., the employee's stock broker). An employee may arrange for a third party financial institution to provide duplicate account statements to an employer, but the employer is still required to review the account statement for compliance with various rules and regulations. Such a process is tedious and time-consuming, especially in the case of an employer with a large number of employees to monitor. Furthermore, since account statements are typically issued monthly or quarterly, the information in the account statement may be out-of-date by the time the employer reviews the account statement.

The systems and methods described herein allow an individual or entity to delegate authority to another individual or entity to access account information from another organization. In specific embodiments, an employee delegates authority to an employer to access account information from a third party financial institution to monitor compliance with various rules and/or regulations.

BRIEF DESCRIPTION OF THE DRAWINGS

FIG. 12 is a table illustrating various information associated with different financial institutions.

FIG. 13 is a table illustrating various customer information related to financial accounts and user preferences.

FIG. 23 illustrates an example display of data related to a particular employee being monitored.

FIG. 24 illustrates a more detailed display of data related to a particular employee being monitored.

FIG. 25 illustrates an example display of data related to the status of various searches performed on the accounts of one or more employees.

FIG. 26 illustrates an example display of data related to employee account information that was flagged during monitoring of one or more employee accounts.

DETAILED DESCRIPTION

Figure 1:
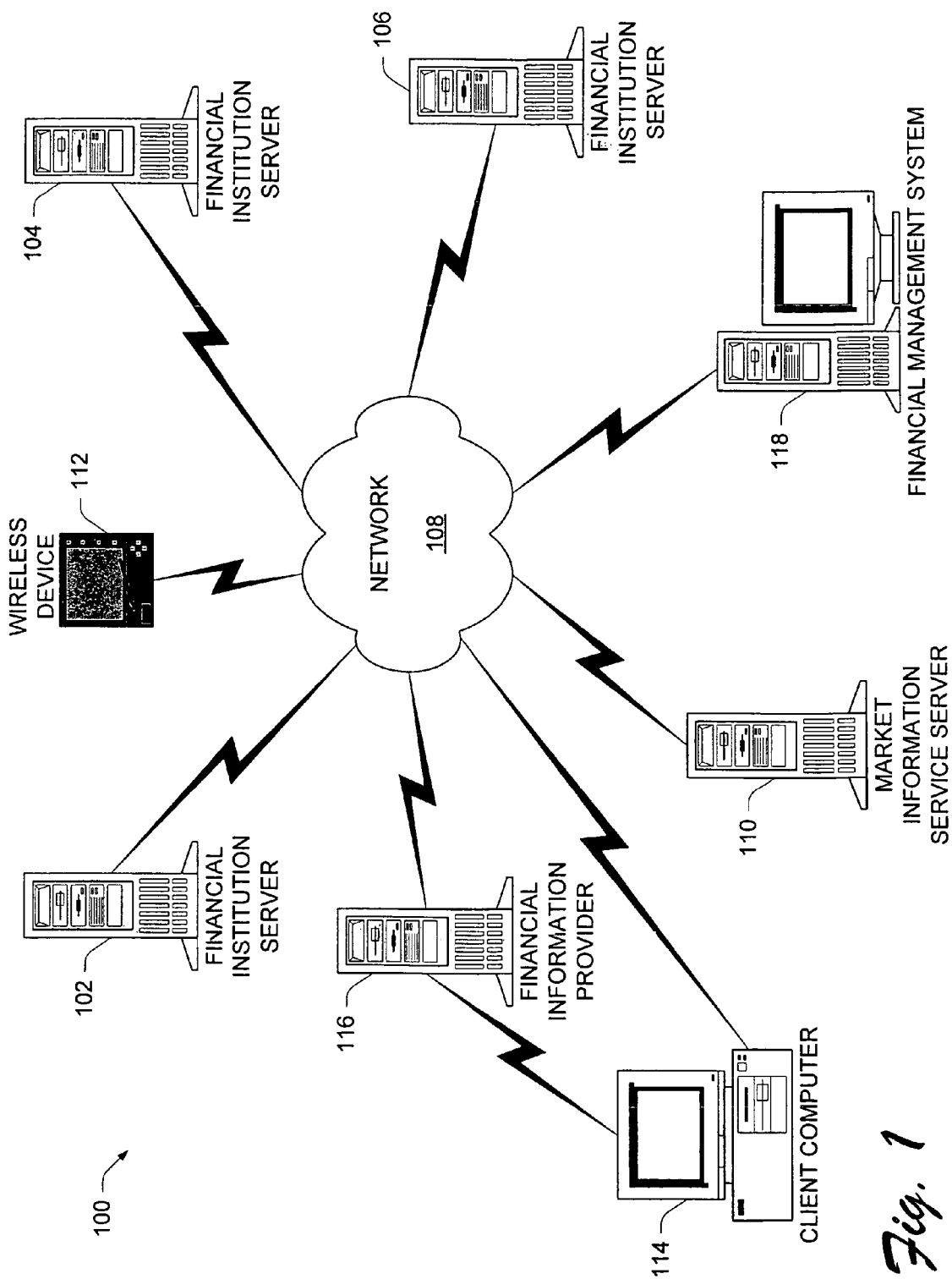
FIG. 1 illustrates an exemplary network environment in which various servers, computing devices, and financial management systems exchange data across a network, such as the Internet.

The systems and methods described herein allow monitoring of an individual or entity to ensure compliance with various rules and/or regulations. These compliance monitoring systems and methods automate many of the procedures that were previously performed manually and allows data to be updated daily (or more frequently) instead of monthly or quarterly. The systems and methods described allow users to define their own searches and search criteria to ensure compliance with the desired rules or regulations.

Certain examples discussed herein are directed toward aggregating financial data and providing authority to access this aggregated financial data as well as access financial accounts directly. However, in alternate embodiments, a user may delegate authority to access any type of account and to delegate authority to access any type of aggregated data. Alternate types of accounts/data include cellular phone usage, automobile usage and service records, etc.

Additional systems and methods described herein automatically analyze multiple financial accounts to determine whether the account balances are optimized based on the best available interest rates, the interest rates associated with the multiple financial accounts, and the balances of the multiple financial accounts. After analyzing the accounts, recommendations are provided, if necessary, for adjusting account funds to allow the account holder to earn greater interest in asset accounts and/or pay less interest in debt accounts. Additionally, recommendations may be provided to adjust account funds from one or more asset accounts to one or more debt accounts, or vice versa if such an adjustment is favorable to the account holder. The systems and methods described herein may operate in a proactive manner, such that the various recommendations are generated without any action or request by the user. The financial management system described herein may regularly analyze a user's accounts and make recommendations, if appropriate, on its own initiative, without any prompting from the user.

As used herein, the terms "account holder", "customer", "user", "employee", and "client" are interchangeable. "Account holder" refers to any person having access to an account. A particular account may have multiple account holders (e.g., a joint checking account having husband and wife as account holders or a corporate account identifying several corporate employees as account holders). Certain account holders may have restricted access to an account, such as authority to view account information but not authority to withdraw or transfer assets in the account. Various financial account and financial institution examples are provided herein for purposes of explanation. However, it will be appreciated that the system and procedures described herein can be used with any type of asset account and any type of debt account. Example asset accounts include savings accounts, money market accounts, checking accounts (both interest-bearing and non-interest-bearing), certificates of deposit (CDs), mutual funds, bonds, and equities. Example debt accounts include credit card accounts, mortgage accounts, home equity loans, overdraft protection, margin accounts, personal loans, and other types of loans. Exemplary financial institutions include banks, savings and loans, credit unions, mortgage companies, mutual fund companies, lending companies, and stock brokers.

Various attributes associated with an asset account and/or a debt account are discussed herein. These attributes are used to analyze various accounts and make recommendations that would benefit the account holder. Example attributes include interest rate, loan repayment terms, minimum balance, type of collateral, etc. Although particular examples are discussed herein with reference to interest rates, it will be appreciated that the methods and systems described herein are applicable to any type of attribute.

FIG. 1 illustrates an exemplary network environment 100 in which various servers, computing devices, and financial management systems exchange data across a data communication network. The network environment of FIG. 1 includes multiple financial institution servers 102, 104, and 106 coupled to a data communication network 108, such as the Internet. A market information service server 110 and a financial management system 118 are also coupled to network 108. Additionally, a wireless device 112 and a client computer 114 are coupled to network 108. Wireless device 112 may be a personal digital assistant (PDA), a handheld or portable computer, a cellular phone, a pager, or any other device capable of communicating with other devices via a wireless connection. A financial information provider 116 is coupled between network 108 and client computer 114.

Network 108 may be any type of data communication network using any communication protocol. Further, network 108 may include one or more sub-networks (not shown) which are interconnected with one another.

The communication links shown between the network 108 and the various devices (102-106 and 110-118) shown in FIG. 1 can use any type of communication medium and any communication protocol. For example, one or more of the communication links shown in FIG. 1 may be a wireless link (e.g., a radio frequency (RF) link or a microwave link) or a wired link accessed via a public telephone system or another communication network. Wireless device 112 typically accesses network 108 via a wireless connection to another communication network that is coupled to network 108. Certain devices, such as servers, may be coupled to a local area network (LAN), which is coupled to network 108. Client computer 114 may access network 108 in different ways. First, client computer 114 may directly access network 108, for example, by using a modem to access a public telephone network (e.g., a public switched telephone network (PSTN)) that is coupled to network 108. Alternately, client computer 114 may access financial information provider 116, which establishes a connection to network 108. Financial information provider 116 may act as a "buffer" between network 108 and client computer 114, or may allow commands and data to simply pass-through between the network 108 and the client computer 114.

Each of the financial institution servers 102, 104, and 106 are typically associated with a particular financial institution and store data for that financial institution, such as customer account data. The market information service server 110 may represent one or more services that collect and report information regarding current financial market conditions. For example, a particular market information service may collect information from many financial institutions to generate a report identifying the average interest rates for savings, checking, or other accounts. The report may also identify the highest rates for each type of account and the financial institution offering those rates. Multiple market information service servers 110 may be coupled to network 108, each server providing a different type of market data.

Financial management system 118 performs various account analysis functions to determine whether a user's financial accounts (e.g., both asset accounts and debt accounts) are optimized. These analysis functions are discussed in greater detail below. Wireless device 112 and client computer 114 allow a user to access information via the network 108. For example, the user can access account information from one of the financial institution servers 102, 104, or 106, access current interest rate data from market information service server 110, or send a request for an analysis of the user's financial accounts to financial management system 118. Financial information provider 116 acts as an intermediary between client computer 114 and other devices coupled to network 108. For example, client computer 114 generates a request for data or account analysis and communicates the request to the financial information provider 116. The financial information provider 116 then retrieves the requested data or initiates the requested account analysis on behalf of the user of client computer 114.

Figure 2:
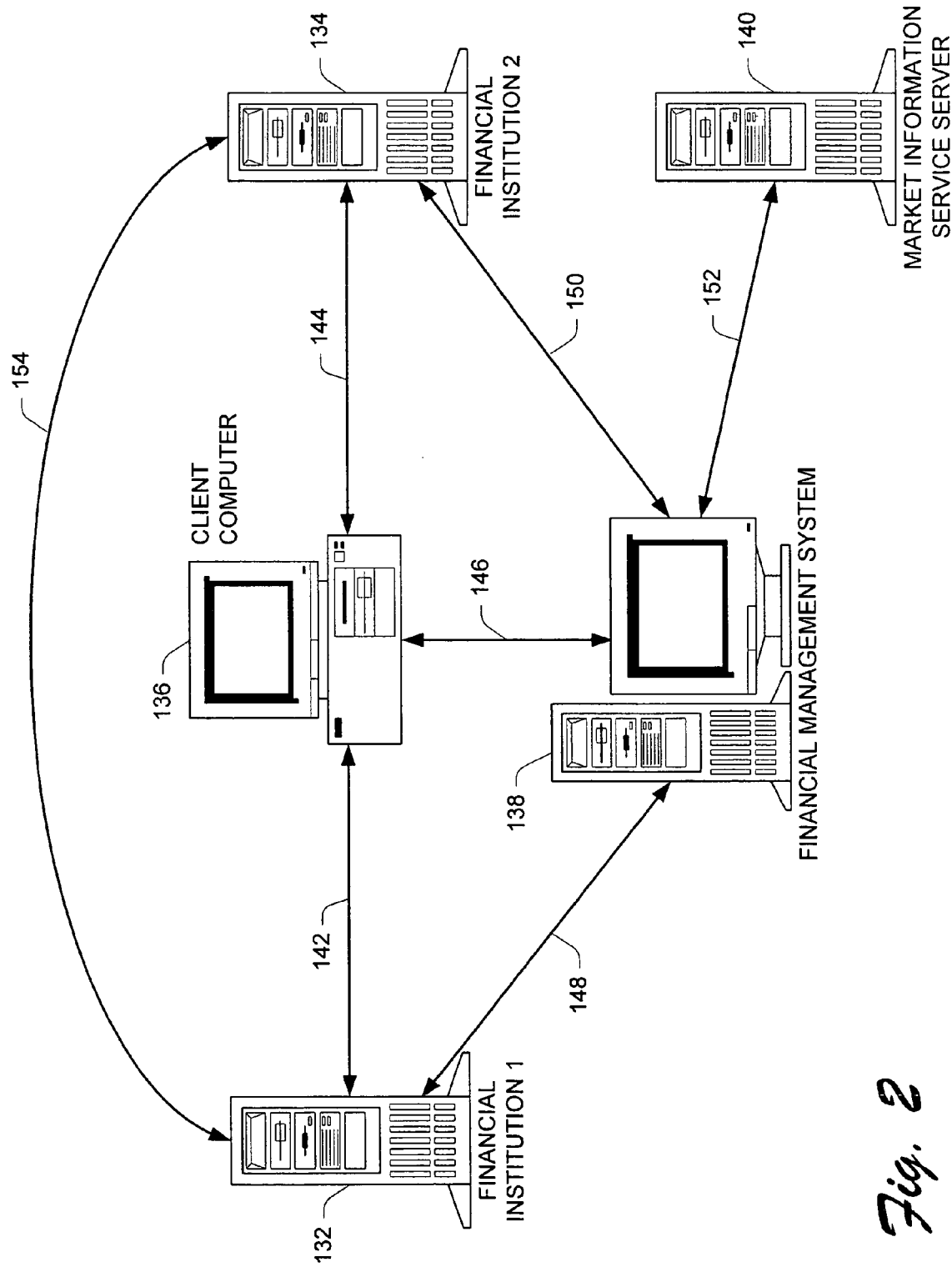
FIG. 2 illustrates an example of the interaction between a particular pair of financial institution servers, a market information service, a client computer, and a financial management system.

FIG. 2 illustrates an example of the interaction between a particular pair of financial institution servers 132 and 134, a market information service server 140, a client computer 136, and a financial management system 138. Client computer 136 is capable of accessing financial institution server 132 via a communication link 142 and accessing financial institution server 134 via a communication link 144. For example, the user of client computer 136 may retrieve account information or interest rate information from one or both of the financial institution servers 132, 134. Client computer 136 is also capable of interacting with financial management system 138 via a communication link 146. The user of client computer 136 may access financial management system 138, for example, to have the system analyze the user's financial accounts.

Financial management system 138 is coupled to the two financial institution servers 132 and 134 via two communication links 148 and 150, respectively. Communication links 148 and 150 allow the financial management system 138 to retrieve information from the financial institution servers 132, 134, and execute transactions on the financial institution servers on behalf of the user of client computer 136. Financial management system 138 is also coupled to market information service server 140 through a communication link 152, which allows the financial management system to retrieve various information regarding market interest rates and other market data. Financial institution servers 132 and 134 are capable of communicating with one another via a communication link 154, which allows the servers to exchange data and other information with one another.

Communication links 142-154 may be dial-up connections and/or connections via one or more networks of the type discussed above with respect to FIG. 1.

Figure 3:
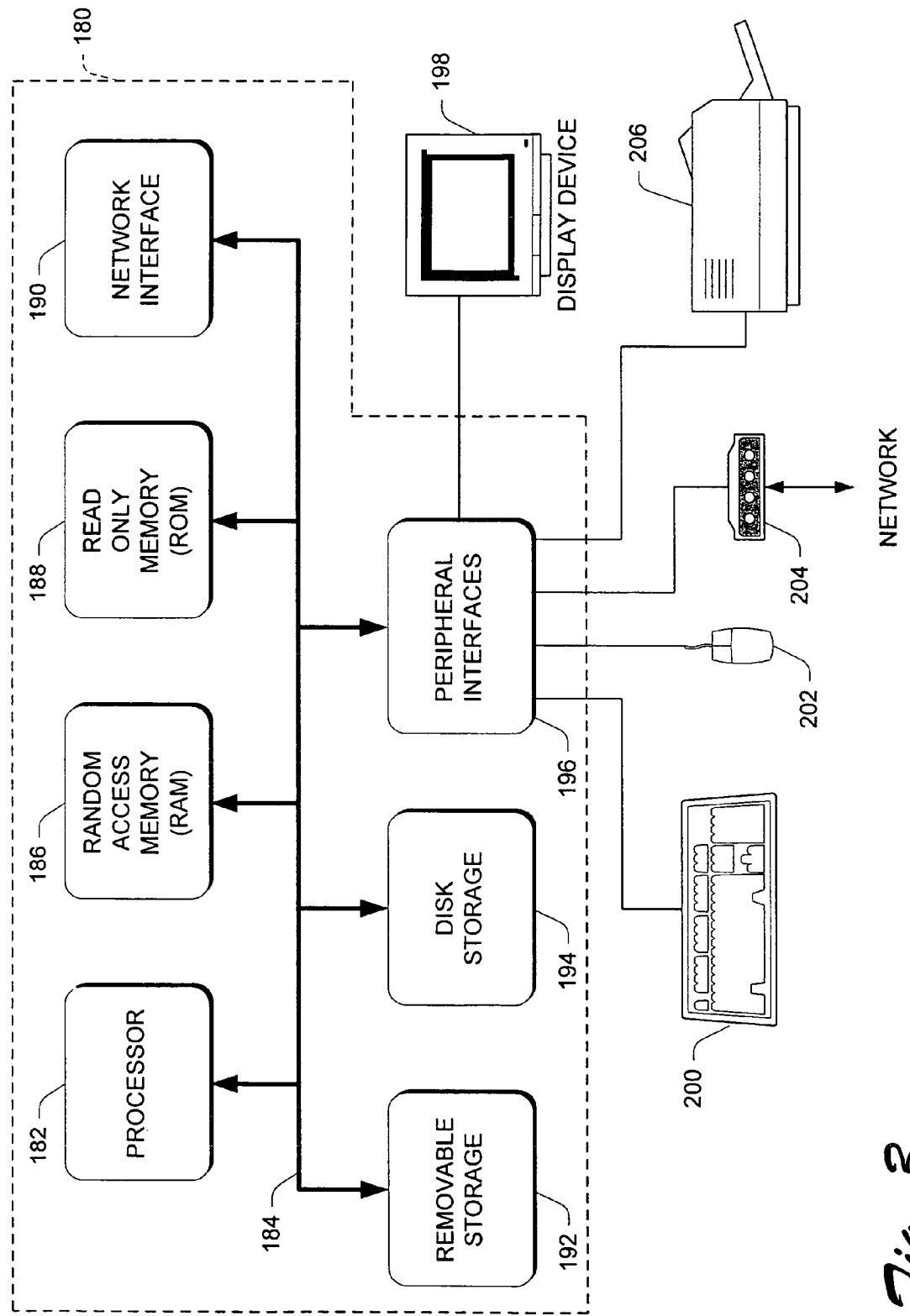
FIG. 3 is a block diagram showing pertinent components of a computer in accordance with the invention.

FIG. 3 is a block diagram showing pertinent components of a computer 180 in accordance with the invention. A computer such as that shown in FIG. 3 can be used, for example, to perform various financial analysis operations such as accessing and analyzing a user's financial account information to make account recommendations. Computer 180 can also be used to access a web site or other computing facility to access the various financial analysis functions. The computer shown in FIG. 3 can function as a server, a client computer, or a financial management system, of the types discussed herein.

Computer 180 includes at least one processor 182 coupled to a bus 184 that couples together various system components. Bus 184 represents one or more of any of several types of bus structures, such as a memory bus or memory controller, a peripheral bus, and a processor or local bus using any of a variety of bus architectures. A random access memory (RAM) 186 and a read only memory (ROM) 188 are coupled to bus 184. Additionally, a network interface 190 and a removable storage device 192, such as a floppy disk or a CD-ROM, are coupled to bus 184. Network interface 190 provides an interface to a data communication network such as a local area network (LAN) or a wide area network (WAN) for exchanging data with other computers and devices. A disk storage 194, such as a hard disk, is coupled to bus 184 and provides for the non-volatile storage of data (e.g., computer-readable instructions, data structures, program modules and other data used by computer 180). Although computer 180 illustrates a removable storage 192 and a disk storage 194, it will be appreciated that other types of computer-readable media which can store data that is accessible by a computer, such as magnetic cassettes, flash memory cards, digital video disks, and the like, may also be used in the exemplary computer.

Various peripheral interfaces 196 are coupled to bus 184 and provide an interface between the computer 180 and the individual peripheral devices. Exemplary peripheral devices include a display device 198, a keyboard 200, a mouse 202, a modem 204, and a printer 206. Modem 204 can be used to access other computer systems and devices directly or by connecting to a data communication network such as the Internet.

A variety of program modules can be stored on the disk storage 194, removable storage 192, RAM 186, or ROM 188, including an operating system, one or more application programs, and other program modules and program data. A user can enter commands and other information into computer 180 using the keyboard 200, mouse 202, or other input devices (not shown). Other input devices may include a microphone, joystick, game pad, scanner, satellite dish, or the like.

Computer 180 may operate in a network environment using logical connections to other remote computers. The remote computers may be personal computers, servers, routers, or peer devices. In a networked environment, some or all of the program modules executed by computer 180 may be retrieved from another computing device coupled to the network.

Typically, the computer 180 is programmed using instructions stored at different times in the various computer-readable media of the computer. Programs and operating systems are often distributed, for example, on floppy disks or CD-ROMs. The programs are installed from the distribution media into a storage device within the computer 180. When a program is executed, the program is at least partially loaded into the computer's primary electronic memory. As described herein, the invention includes these and other types of computer-readable media when the media contains instructions or programs for implementing the steps described below in conjunction with a processor. The invention also includes the computer itself when programmed according to the procedures and techniques described herein.

For purposes of illustration, programs and other executable program components are illustrated herein as discrete blocks, although it is understood that such programs and components reside at various times in different storage components of the computer, and are executed by the computer's processor. Alternatively, the systems and procedures described herein can be implemented in hardware or a combination of hardware, software, and/or firmware. For example, one or more application specific integrated circuits (ASICs) can be programmed to carry out the systems and procedures described herein.

Figure 4:
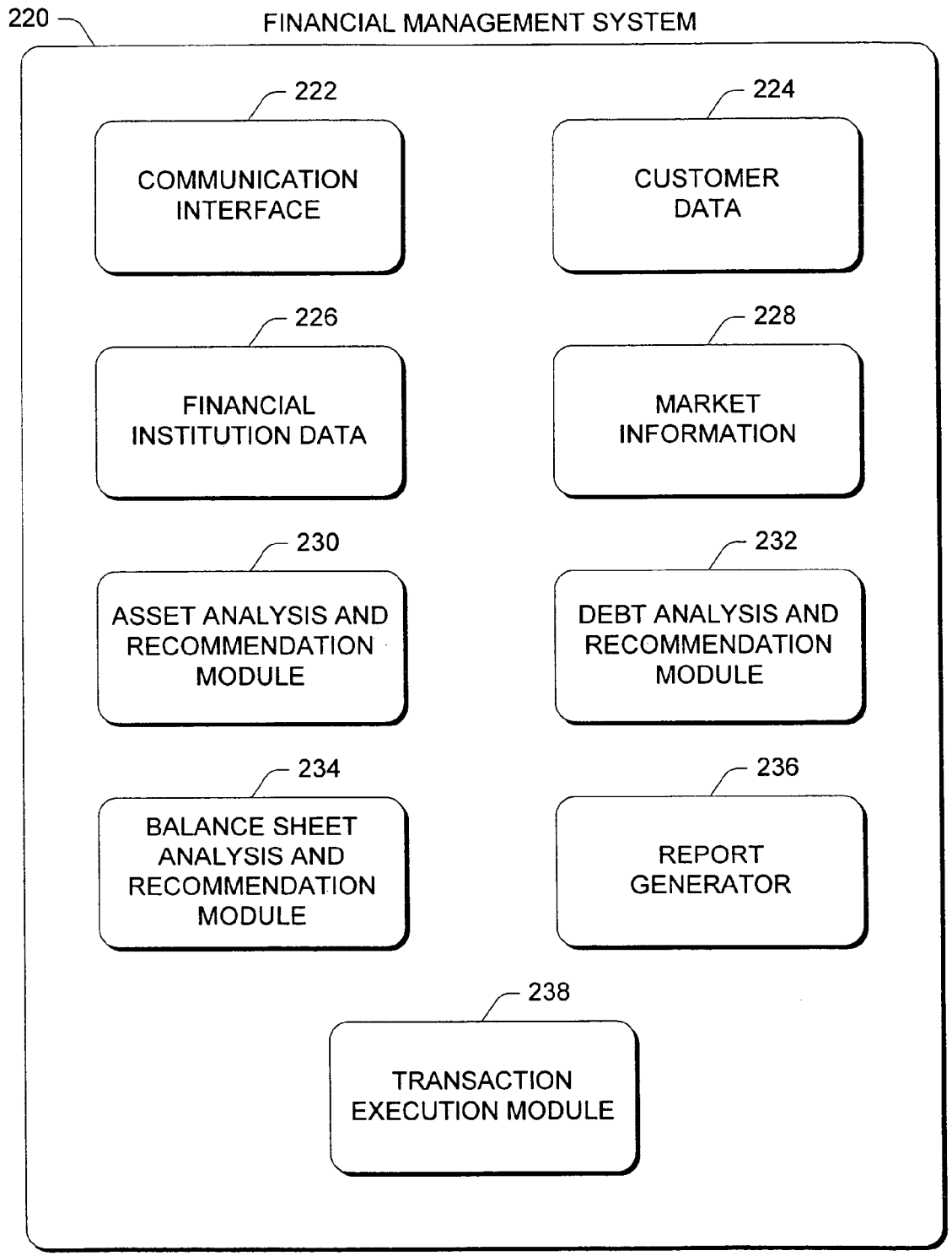
FIG. 4 is a block diagram showing exemplary components and modules of a financial management system.

FIG. 4 is a block diagram showing exemplary components and modules of a financial management system 220. A communication interface 222 allows the financial management system 220 to communicate with other computing systems, such as servers, client computers, and portable computing devices. In one embodiment, communication interface 222 is a network interface to a LAN, which is coupled to another data communication network, such as the Internet.

The financial management system 220 stores customer data 224, such as customer account information, online banking login name and password, and user preferences. Financial management system 220 also stores financial institution data 226 and market information 228. Financial institution data 226 includes, for example, transaction routing data, account offerings, account interest rates, and minimum account balances. Market information 228 includes data such as average interest rates for different types of accounts (both asset accounts and debt accounts), the best available interest rates for each type of account, and the financial institutions offering the best available interest rates.

An asset analysis and recommendation module 230 analyzes various asset accounts to determine whether the accounts are earning the best available interest rates (or close to the best interest rates) and whether the fund allocation among the asset accounts is optimal or close to optimal. If fund adjustments would benefit the account holder, then module 230 makes the appropriate recommendations to the account holder. The asset accounts analyzed may be associated with two or more different financial institutions. A debt analysis and recommendation module 232 analyzes various debt accounts to determine whether the accounts are paying the most competitive (i.e., the lowest) interest rates or close to the best interest rates. Module 232 also determines whether the allocation of funds among the debt accounts is optimal or close to optimal, and makes recommendations, if necessary, to adjust funds in a manner that reduces the overall interest payments. The debt accounts analyzed may be associated with two or more different financial institutions.

A balance sheet analysis and recommendation module 234 analyzes both asset accounts and debt accounts to determine whether the allocation of funds among all of the accounts is optimal or close to optimal. If fund adjustments would benefit the account holder, then the balance sheet analysis and recommendation module 234 makes the appropriate recommendations to the account holder.

A report generator 236 generates various types of reports, such as account activity history, current recommendations to adjust funds among accounts, or a report comparing the current market interest rates to the interest rates of a user's current accounts. A transaction execution module 238 executes financial transactions at the direction of account holders. For example, an account holder may request that the financial management system 220 execute the recommendations generated by one or more of the three analysis and recommendation modules 230, 232, and 234. In this example, transaction execution module 238 identifies the recommendations and executes the financial transactions necessary to implement the recommendations.

Figure 5:
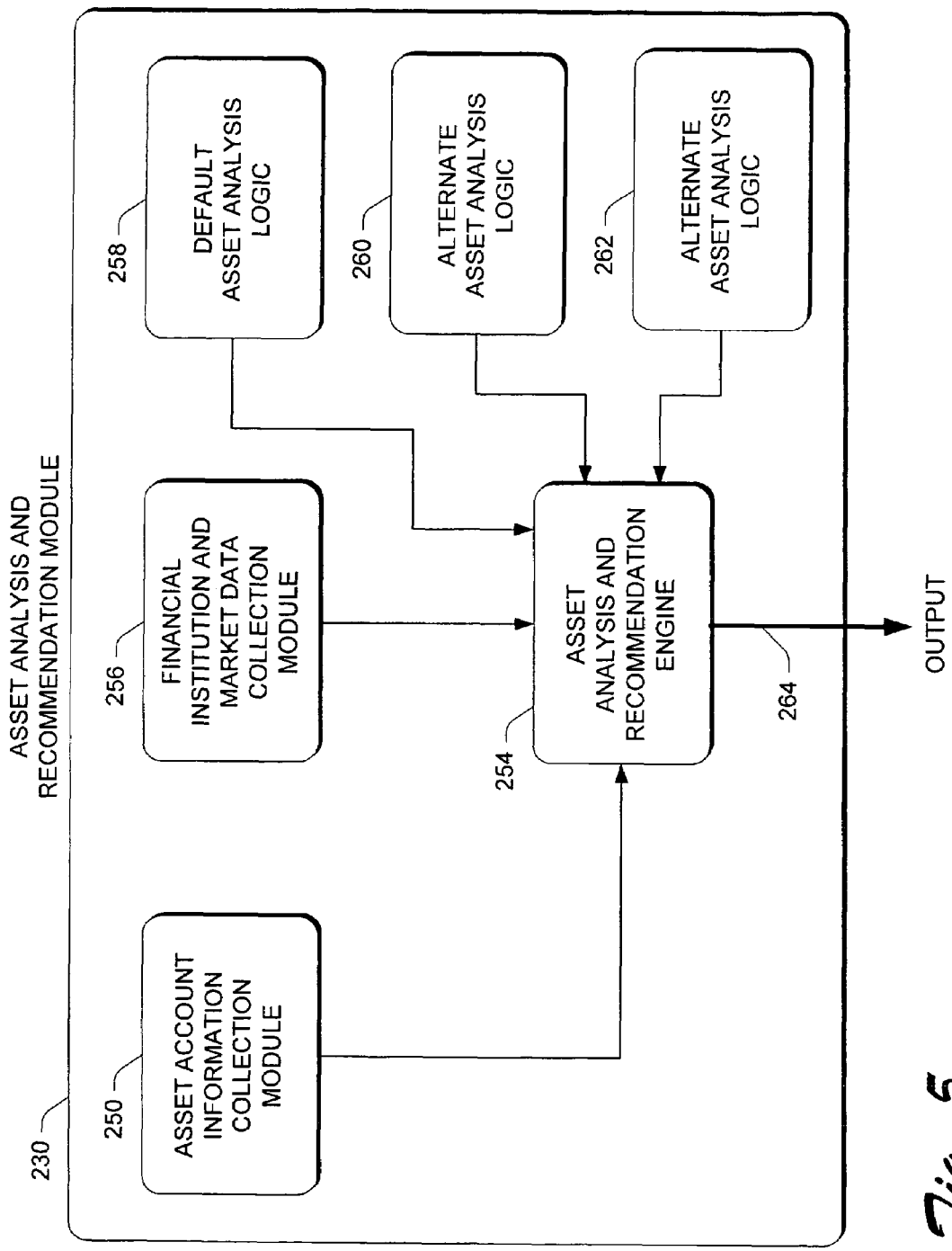
FIG. 5 is a block diagram showing exemplary components and modules of an asset analysis and recommendation module.

FIG. 5 is a block diagram showing exemplary components and modules of asset analysis and recommendation module 230. An asset account information collection module 250 collects information about a user's asset accounts. When a user accesses the financial management system and requests an analysis of the user's asset accounts, the system prompts the user to enter account information for all of the user's asset accounts. The information provided for each account may include the name of the financial institution, the account number, and the login name and password for online access to the account. This information is typically stored by the financial management system to avoid asking the user to re-enter the same information in the future. Based on the information provided by the user, the asset account information collection module 250 is able to access the user's accounts and determine the balance of each account as well as other information such as the interest rate and minimum balance for the account.

After collecting the user's asset account information, the collection module 250 organizes the account information into a common format and communicates the information to an asset analysis and recommendation engine 254 for processing.

A financial institution and market data collection module 256 collects information about particular financial institutions (e.g., transaction routing information and account offerings) and information about current market interest rates. The information about financial institutions may be retrieved from the financial institutions themselves or from one or more market information services that provide information about various financial institutions. The information relating to current market interest rates is collected from one or more market information services. After collecting the financial institution information and the market data, the collection module 256 communicates the collected information and data to the asset analysis and recommendation engine 254.

A default asset analysis logic 258 defines a default set of logic rules used to analyze a user's asset accounts. These default logic rules are used if the user does not create their own set of logic rules and does not select from one of several sets of alternate asset analysis logic rules 260 and 262. The alternate logic rules 260 and 262 may provide different approaches to asset account analysis (e.g., a conservative approach, a moderate approach, or an aggressive approach). In particular embodiments, at least one of the alternate logic rules 260, 262 is associated with a financial and/or investment celebrity, who defines the particular set of logic rules based on their financial and/or investment expertise.

The particular logic rules selected for each user may be different based on the sets of logic rules chosen by the user. Additionally, the logic rules selected for a particular user may change over time as the financial management system learns more about the user's payment or spending habits. For example, if the user regularly makes a $1000 payment from a particular checking account on the 15th of each month, a rule may be created by the financial management system to ensure that the checking account has at least a $1000 balance on the 14th of each month. If the checking account does not have a sufficient balance, then the financial management system may recommend a fund transfer to raise the balance of the checking account to cover the anticipated $1000 payment on the 15th. This type of user-specific logic rule may be stored with the other user data in the financial management system.

Asset analysis and recommendation engine 254 analyzes the user's asset account information by applying the various asset analysis logic rules to the asset account information. The asset analysis and recommendation engine 254 also considers market data collected by collection module 256 when analyzing the user's asset accounts. After analyzing the user's asset accounts, the asset analysis and recommendation engine 254 generates one or more recommendations to adjust the fund allocation among the asset accounts. The recommendation may also include opening a new asset account (e.g., an account that pays a higher interest rate) and/or closing an existing asset account (e.g., an account that pays a low interest rate). The recommendations and analysis results are output on communication link 264 for use by other modules or components in the financial management system.

Figure 6:
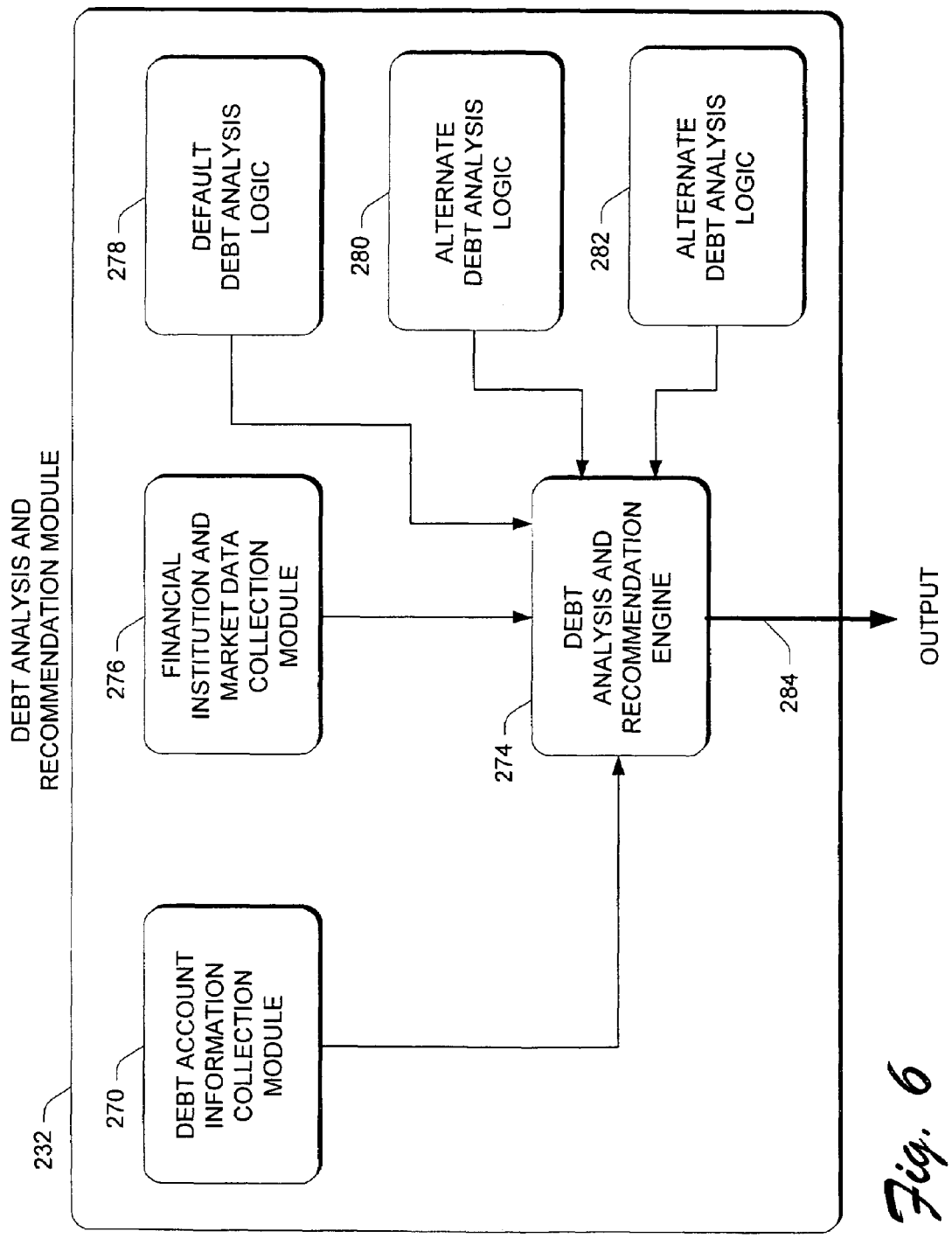
FIG. 6 is a block diagram showing exemplary components and modules of a debt analysis and recommendation module.

FIG. 6 is a block diagram showing exemplary components and modules of debt analysis and recommendation module 232. A debt account information collection module 270 collects information about a user's debt accounts. When a user accesses the financial management system and requests an analysis of the user's debt accounts, the system prompts the user to enter account information for each of the user's debt accounts. The information provided for each account may include the name of the financial institution, the account number, and information necessary to access the account online. This information is typically stored by the financial management system to avoid asking the user to re-enter the same information in the future. Based on the information provided by the user, the debt account collection module 270 accesses the user's debt accounts and determines the balance of each account as well as other information, such as the interest charged and the maximum balance for the account.

After collecting the user's debt account information, the collection module 270 organizes the account information into a common format and communicates the account information to a debt analysis and recommendation engine 274 for processing.

A financial institution and market data collection 276 collects information regarding particular financial institutions and information about current market interest rates. The information relating to financial institutions may be retrieved from the financial institutions themselves or from one or more market information services that provide information about various financial institutions. The information relating to current market interest rates is collected from one or more market information services. After collecting the financial institution information and the market data, the collection module 276 communicates the collected information and data to the debt analysis and recommendation engine 274.

A default debt analysis logic 278 defines a default set of logic rules used to analyze a user's debt accounts. These default logic rules are used if the user does not create their own set of logic rules and does not select from one of the several sets of alternate debt analysis logic 280 and 282. The alternate logic rules 280 and 282 may provide different approaches to debt account analysis, such as a conservative approach, a moderate approach, or an aggressive approach. In a particular embodiment, at least one of the alternate logic rules 280, 282 is associated with a financial and/or investment celebrity, who defines the particular set of logic rules based on their financial and/or investment expertise.

The particular logic rules selected for each user may be different based on the sets of logic rules chosen by the user. Additionally, the logic rules selected for a particular user may change over time as the financial management system learns more about the user's payment or spending habits. For example, if the user has too many expenses (i.e., the current month's expenses exceed the user's typical monthly income), then the logic rules may suggest a short-term loan to cover the expenses, thereby avoiding a situation in which the user has insufficient funds to pay bills as they become due. Additionally, if the loan will only be required for a short period of time, the rules may suggest opening (or taking advantage of an existing) overdraft protection account.

Different debt logic rules may be applied depending on a user's opinions regarding debt. One user might use the majority of available assets to pay down debts, thereby minimizing the user's level of debt. Another user might want to maintain a larger "cushion" of cash and only pay down debts if the available assets exceed a predetermined amount (e.g., $10,000). Debt rules from, for example, a celebrity or well-known financial analyst might recommend setting aside savings at the beginning of the month to "force" the appropriate monthly savings. The remainder of the assets are then used to pay monthly bills and other expenses. Other financial analysts may use different sets of logic rules to define the analysis and handling of asset accounts and debt accounts.

Debt analysis and recommendation engine 274 analyzes the user's debt account information by applying the various debt analysis logic rules to the debt account information. The debt analysis and recommendation engine 274 also considers market data collected by collection module 276 when analyzing the user's debt accounts. After analyzing the user's debt accounts, the debt analysis and recommendation engine 274 generates one or more recommendations to adjust the fund allocation among the debt accounts. The recommendation may also include opening a new debt account (e.g., an account with a lower interest rate) and/or closing an existing debt account (e.g., an account with a high interest rate). The recommendations and analysis results are output on communication link 284 for use by other modules or components in the financial management system.

Figure 7:
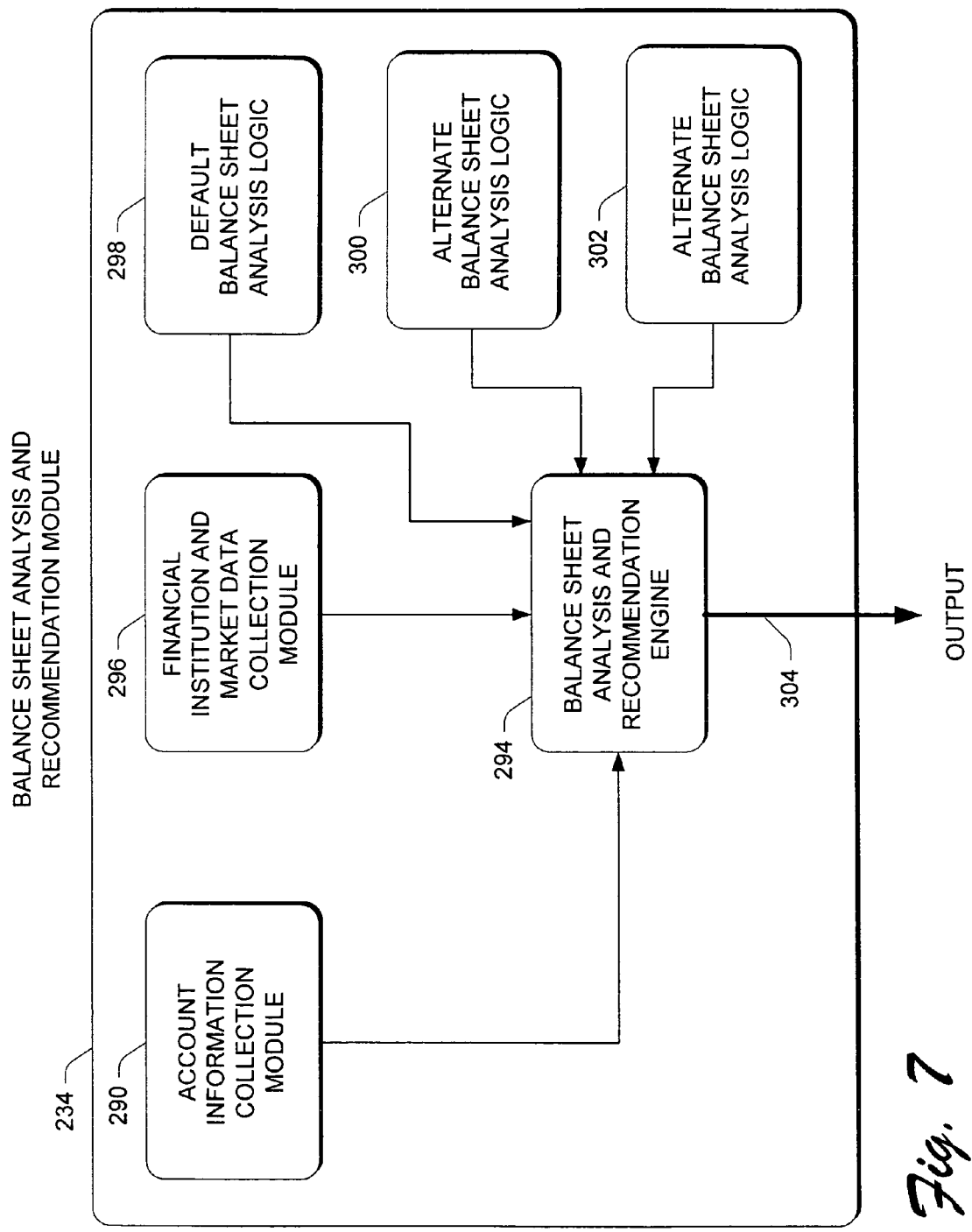
FIG. 7 is a block diagram showing exemplary components and modules of a balance sheet analysis and recommendation module.

FIG. 7 is a block diagram showing exemplary components and modules of balance sheet analysis and recommendation module 234. An account information collection module 290 collects information about a user's asset accounts and debt accounts. When a user accesses the financial management system and requests an analysis of the user's balance sheet, the system prompts the user to enter account information for each of the user's asset accounts and debt accounts. The information provided for each account may include the name of the financial institution, the account number, and information necessary to access the account online. This information is typically stored by the financial management system to avoid asking the user to re-enter the same information in the future. Based on the information provided by the user, the account collection module 290 accesses the user's debt accounts and determines the balance of each account as well as other information, such as the interest charged or earned, and the maximum balance or credit limit associated with the account.

After collecting the user's asset and debt account information, the collection module 290 organizes the account information into a common format and communicates the account information to a balance sheet analysis and recommendation engine 294 for processing.

A financial institution and market data collection 296 collects information regarding particular financial institutions and information about current market interest rates for both asset accounts and debt accounts. The information relating to financial institutions may be retrieved from the financial institutions themselves or from one or more market information services that provide information about various financial institutions. The information relating to current market interest rates is collected from one or more market information services. After collecting the financial institution information and the market data, the collection module 296 communicates the collected information and data to the balance sheet analysis and recommendation engine 294.

A default balance sheet analysis logic 298 defines a default set of logic rules used to analyze a user's balance sheet. These default logic rules are used if the user does not create their own set of logic rules and does not select from one of the several sets of alternate balance sheet analysis logic 300 and 302. The alternate logic rules 300 and 302 may provide different approaches to debt account analysis, such as a conservative approach, a moderate approach, or an aggressive approach. In a particular embodiment, at least one of the alternate logic rules 300, 302 is associated with a financial and/or investment celebrity, who defines the particular set of logic rules based on their financial and/or investment expertise.

The particular logic rules selected for each user may be different based on the sets of logic rules chosen by the user. Additionally, the logic rules selected for a particular user may change over time as the financial management system learns more about the user's payment or spending habits. For example, if the user has funds earning a low interest rate in a savings account and carries a balance on a credit card with a high interest rate, the logic rules may suggest apply some or all of the funds in the savings account to pay off all or a portion of the balance on the credit card.

Different balance sheet logic rules may be applied depending on a user's opinions regarding assets and debts. One user might prefer to use the majority of available assets to pay down debts, thereby minimizing the user's level of debt. Another user might want to maintain a larger "cushion" of cash and only pay down debts if the available assets exceed a predetermined amount (e.g., $5,000).

Balance sheet analysis and recommendation engine 294 analyzes the user's balance sheet information by applying the various balance sheet analysis logic rules to the balance sheet information. The balance sheet analysis and recommendation engine 294 also considers financial institution and market data collected by collection module 296 when analyzing the user's balance sheet. After analyzing the user's balance sheet, the balance sheet analysis and recommendation engine 294 generates one or more recommendations to adjust the fund allocation among the user's asset accounts and debt accounts. The recommendation may also include opening one or more new accounts and/or closing one or more existing accounts. The recommendations and analysis results are output on communication link 304 for use by other modules or components in the financial management system.

Figure 8:
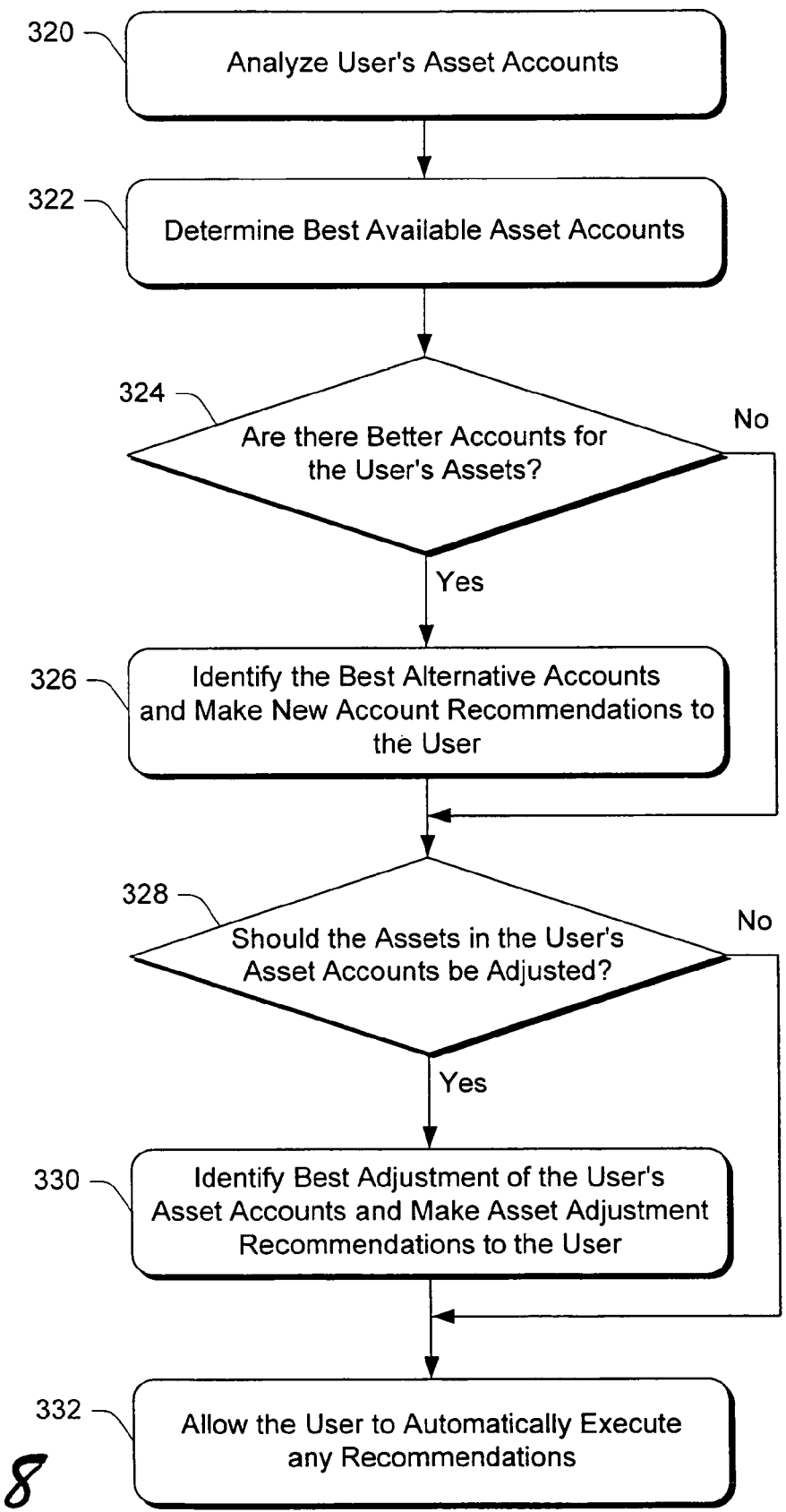
FIG. 8 is a flow diagram illustrating a procedure for identifying financial transactions to optimize a user's asset account balances.

FIG. 8 is a flow diagram illustrating a procedure for identifying financial transactions to optimize a user's asset account balances. The procedure begins by analyzing the user's asset accounts (block 320). The procedure then determines the best available asset accounts (block 322), for example, by using market interest rate information from a market information service. Next, the procedure determines whether there are better accounts for the user's assets (block 324). These "better" accounts may include asset accounts that earn higher interest rates than the user's current asset accounts.

If the procedure identifies better accounts for the user's assets, then the procedure selects the best alternative account (or accounts) and makes a recommendation that the user open the alternative account (block 326). If the procedure does not identify any better accounts for the user's assets, then the procedure continues to block 328, where the procedure determines whether the assets in the user's accounts should be adjusted. If the user's asset accounts should be adjusted, then the procedure identifies the best adjustment of the user's asset accounts and makes asset adjustment recommendations to the user (block 330). Finally, the user is provided the opportunity to automatically execute any of the recommendations, such as opening one or more new asset accounts and/or moving funds between asset accounts (block 332). If the user chooses to have the recommendations executed automatically, the financial management system executes the necessary financial transactions to implement the system's recommendations.

The procedure described above with respect to FIG. 8 may be implemented, for example, by asset analysis and recommendation module 230.

Figure 9:
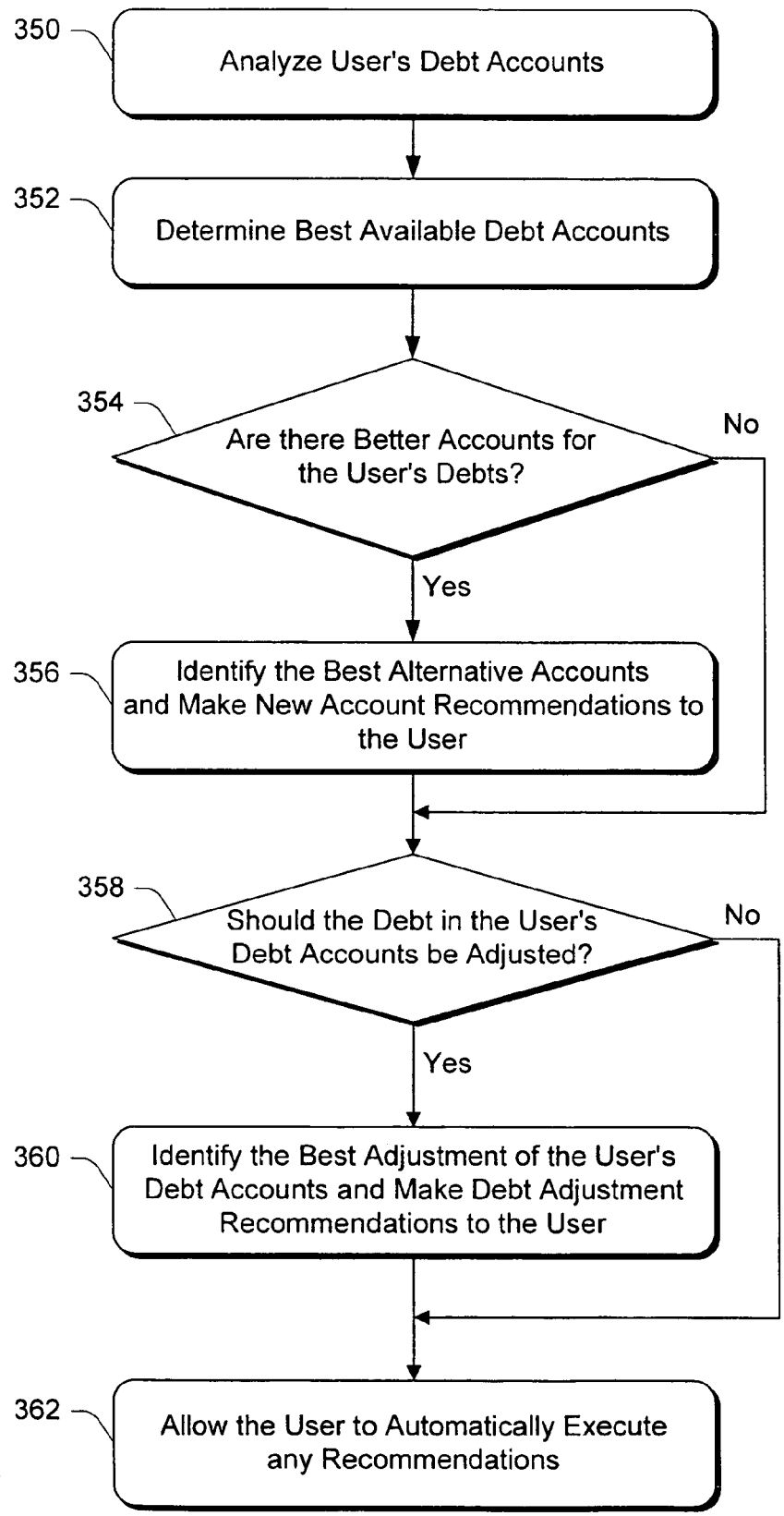
FIG. 9 is a flow diagram illustrating a procedure for identifying financial transactions to optimize a user's debt account balances.

FIG. 9 is a flow diagram illustrating a procedure for identifying financial transactions to optimize a user's debt account balances. The procedure analyzes the user's debt accounts (block 350) and determines the best available debt accounts (block 352). The best available debt accounts are determined, for example, by using market interest rate information from one or more market information services. Next, the procedure determines whether there are better accounts for the user's debts (block 354). These "better" accounts may include debt accounts that charge lower interest rates than the user's current debt accounts.

If better accounts are identified for the user's debts, then the procedure selects the best alternative account (or accounts) and makes a recommendation that the user open the alternative account (block 356). If the procedure does not identify any better accounts for the user's debts, then the procedure continues to block 358, to determine whether the debts in the user's accounts should be adjusted. If the user's debt accounts should be adjusted, then the procedure identifies the best adjustment of the user's debt accounts and makes asset adjustment recommendations to the user (block 360). Finally, the user is provided the opportunity to automatically execute any of the recommendations, such as opening one or more new debt accounts and/or moving funds between debt accounts (block 362). If the user chooses to have the recommendations executed automatically, the financial management system executes the necessary financial transactions to implement the system's recommendations. The procedure described above with respect to FIG. 9 can be implemented, for example, by debt analysis and recommendation module 232.

Figure 10:
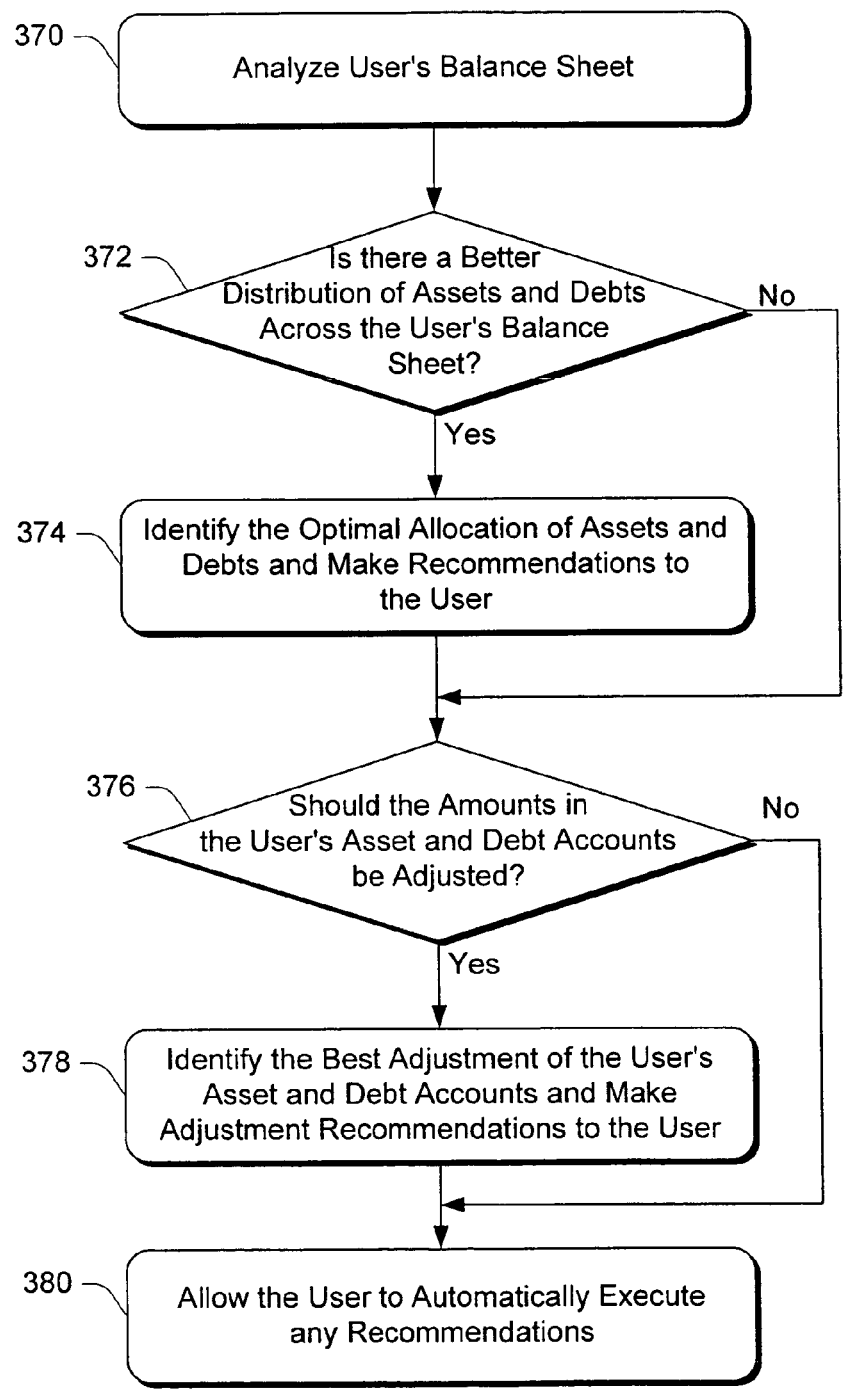
FIG. 10 is a flow diagram illustrating a procedure for identifying financial transactions to optimize a user's balance sheet.

FIG. 10 is a flow diagram illustrating a procedure for identifying financial transactions to optimize a user's balance sheet. The procedure analyzes the user's balance sheet (block 370) and determines whether there is a better distribution of assets and debts across the user's balance sheet (block 372). For example, a "better distribution" of assets and debts may result in greater interest earned by the user or less interest paid by the user. If there is a better distribution of assets and debts across the user's balance sheet, then the procedure identifies the optimal allocation of assets and debts and makes recommendations to the user (block 374).

If the procedure does not identify any better distribution of assets and debts, then the procedure continues to block 376, to determine whether the amounts in the user's asset and debt accounts should be adjusted. If the user's accounts should be adjusted, then the procedure identifies the best adjustment of the user's asset and debt accounts and makes adjustment recommendations to the user (block 378). Finally, the user is provided the opportunity to automatically execute any of the recommendations (block 380), such as moving funds between accounts to maximize interest earned or minimize interest paid. If the user chooses to have the recommendations executed automatically, the financial management system executes the necessary financial transactions to implement the system's recommendations. The procedure described above with respect to FIG. 10 can be implemented, for example, by balance sheet analysis and recommendation module 234.

A user may choose to have the financial management system 220 (FIG. 4) analyze and make recommendations regarding the user's asset accounts, while ignoring the user's debt accounts. FIG. 8 illustrates an example procedure for this type of analysis and recommendation. Additionally, the user may select specific asset accounts to ignore during the analysis procedure. For example, the user may have a savings account for a special purpose. Even though the savings account may earn a below-average interest rate, the user does not want funds transferred into or out of that savings account. In this example, the user would instruct the financial management system to ignore that particular savings account.

The user may also choose to have the financial management system analyze and make recommendations regarding the user's debt accounts, while ignoring the user's asset accounts. FIG. 9 illustrates an example procedure for this type of analysis and recommendation. Additionally, the user may select specific debt accounts to ignore during the analysis procedure. For example, the user may want to pay-off and close a particular debt account even though the account has a favorable interest rate. In this example, the user would instruct the financial management system to ignore that particular debt account when performing its analysis.

The user can also choose to have the financial management system analyze and make recommendations regarding both the user's asset accounts and debt accounts (i.e., analyze the user's balance sheet). FIG. 10 illustrates an example procedure for this type of analysis and recommendation. Additionally, the user may select specific asset accounts or debt accounts to ignore during the analysis procedure. Thus, the user has the option of selecting the types of accounts to consider, as well as specific accounts to consider or ignore, when the financial management system performs its analysis and makes recommendations.

Figure 11:
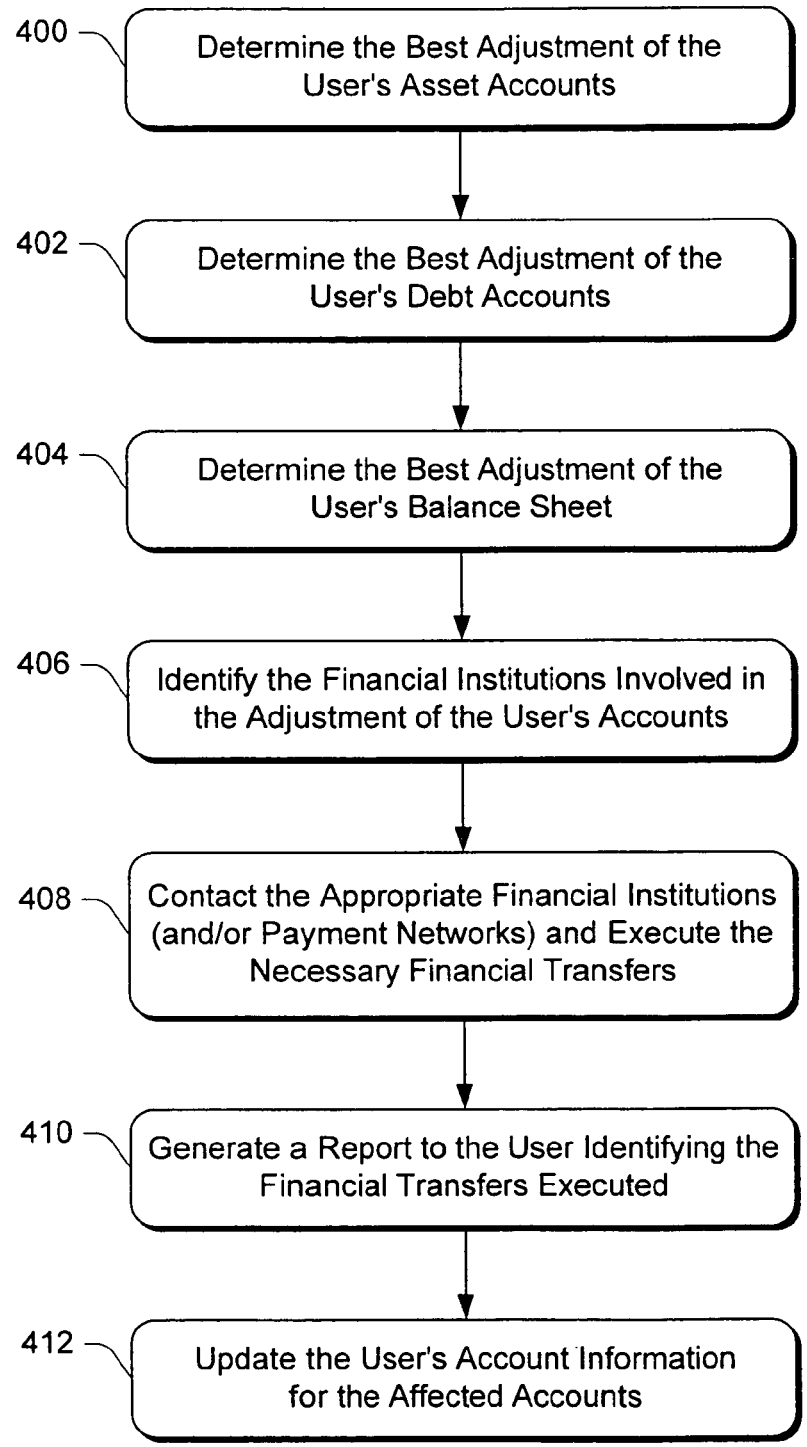
FIG. 11 is a flow diagram illustrating a procedure for automatically optimizing a user's asset accounts, debt accounts, and balance sheet.

FIG. 11 is a flow diagram illustrating a procedure for automatically optimizing a user's asset accounts, debt accounts, and balance sheet. Initially, the procedure determines the best adjustment of the user's asset accounts (block 400). The best adjustment of the user's asset accounts may include opening a new account, closing an existing account, and/or transferring funds between accounts (new accounts or existing accounts). If the user's asset accounts are already optimized, or almost optimized, the procedure determines that no adjustment of asset accounts is necessary.

Next, the procedure determines the best adjustment of the user's debt accounts (block 402) and the best adjustment of the user's balance sheet (block 404). The best adjustment of the user's debt accounts and the user's balance sheet may include opening one or more new accounts, closing one or more existing accounts, and/or transferring funds between accounts (new accounts or existing accounts). If the user's debt accounts are already optimized, or almost optimized, the procedure determines that no adjustment of debt accounts is necessary. Similarly, if the user's balance sheet is already optimized, or almost optimized, then the procedure determines that no adjustment of asset accounts or debt accounts is necessary.

The various logic rules discussed above, which are used by the financial management system to determine whether funds should be adjusted between accounts, may define how to determine whether accounts are "almost optimized." Typical factors that may be considered in determining whether accounts are "almost optimized" include: the savings (extra interest earned or less interest paid) that would result from an adjustment of funds, the difference in interest rates, the time required to implement the adjustment of funds, fees associated with the adjustment of funds, and the "risk" associated with the adjustment. The "risk" may be overdrawing an account by leaving too little funds to cover unexpected expenses (or expenses that are greater than expected).

For example, if a particular adjustment of funds would result in an increase in interest earnings of three cents per week, most logic rules will consider this situation "almost optimized." In this situation, the financial management system will not recommend the adjustment of funds because the additional interest is insignificant.

After the procedure has determined the best adjustment of the user's accounts (blocks 400, 402, and 404), the procedure identifies the financial institutions involved in the adjustment of the user's accounts (block 406). The financial institutions are determined from the information entered by the user when identifying the user's accounts to the financial management system. Next, the procedure contacts the appropriate financial institutions and/or payment networks and executes the financial transfers necessary to implement the recommended adjustments to the user's accounts (block 408). A payment network may be, for example, the Federal Automated Clearing House (ACH), a debit network, a credit network, the federal wire system, or an ATM network. The financial management system is able to automatically access the user's accounts by using the login name and password for the account, which is provided by the user when identifying the user's accounts to the financial management system.

After executing the financial transactions necessary to implement the recommended adjustments to the user's accounts, the a report is generated for the user that identifies the financial transfers executed (block 410). Finally, the user's account information is updated in the financial management system such that the system has accurate account balance information for all of the user's accounts (block 412).

The procedure described above with respect to FIG. 11 can be modified based on the user's preferences with respect to the types of accounts to be analyzed. For example, if the user selects only asset accounts for analysis, then the functions associated with blocks 402 and 404 of the procedure are not performed.

FIG. 12 shows a table 430 illustrating various information associated with different financial institutions. The information contained in table 430 may be obtained from the financial institution itself or from one or more market information services. The information contained in table 430 is periodically updated by comparing the information stored in the table against the current financial institution information.

The first column of table 430 identifies the name of the financial institution and the second column identifies the American Banking Association (ABA) number and routing number. The third column indicates an Internet uniform resource locator (URL) associated with the financial institution. The fourth column of table 430 identifies the various account offerings from a particular financial institution. In this example, Bank of America offers a savings account, two types of checking accounts (interest bearing and non-interest bearing), a three month certificate of deposit (CD), a home equity loan, a credit card account, and overdraft protection for a checking account. The next column indicates the type of account (e.g., an asset account or a debt account).

The sixth column of table 430 indicates the current interest rate associated with each account. In the case of an asset account, the interest rate is the interest paid to a customer based on the balance in the account. In the case of a debt account, the interest rate is the interest charged to a customer based on the outstanding balance of the debt. The last column in table 430 indicates the minimum balance associated with each account. In this example, the debt accounts do not have a minimum balance. However, a debt account may have a maximum balance (e.g., the maximum value that can be loaned). Although not shown in FIG. 12, additional account information may be stored in table 430, such as monthly service charges, per-check charges, service charges for ATM transactions, or service charges if the minimum balance is not maintained.

FIG. 13 shows a table 440 illustrating various customer information related to financial accounts and user preferences. Most information contained in table 440 is obtained from the user during an account setup procedure. The current account balance information is typically retrieved from the financial institution by the financial management system. The account balance information is periodically updated by retrieving current information from the financial institution.

The first column of table 440 identifies the customer name (the table contains customer information for multiple customers accessing the same financial management system). The second column identifies a financial institution and the third column identifies an account number as well as an online username and password associated with the account number. The username and password are used to access the account to perform online banking functions such as executing fund transfers or retrieving current account balances. The fourth column of table 440 identifies the accounts that the customer has with the financial institution (i.e., active accounts). For example, John Smith has five active accounts with Bank of America (savings, interest checking, home equity, credit card, and overdraft protection), one active account with Charles Schwab (money market account), and one active account with Rainbow Credit Union (savings account). The next column in table 440 indicates the current account balance for each active account. The last column indicates user preferences. The user preferences are determined by the user based on the manner in which the user wants information displayed, the manner in which accounts should be analyzed, and the types of recommendations the user desires. Additionally, the user preferences may specify certain minimum balances or other requirements for all accounts or for specific accounts. For example, the user preferences for John Smith specify that a minimum balance of $1500 should be maintained in the interest checking account. These user preferences are typically incorporated into the logic rules, discussed above, which are used to determine when and how to adjust funds between accounts.

Other types of user preferences include a maximum number of transactions per month in a particular account (e.g., some money market accounts set limits on the number of transactions in a particular month). By setting a user preference (or a logic rule) to limit the number of monthly transactions, the financial management system will not recommend (or attempt to execute) too many transactions in a particular month. A user may also set a preference that requires the financial management system to predict expenses for the next seven days (e.g., based on historical expenses during similar periods) and maintain a "buffer" in the account equal to the predicted expenses for the next seven days. Further, a user may set a preference indicating that funds should not be adjusted unless the adjustment results in a savings of at least five dollars per day.

Figure 14:
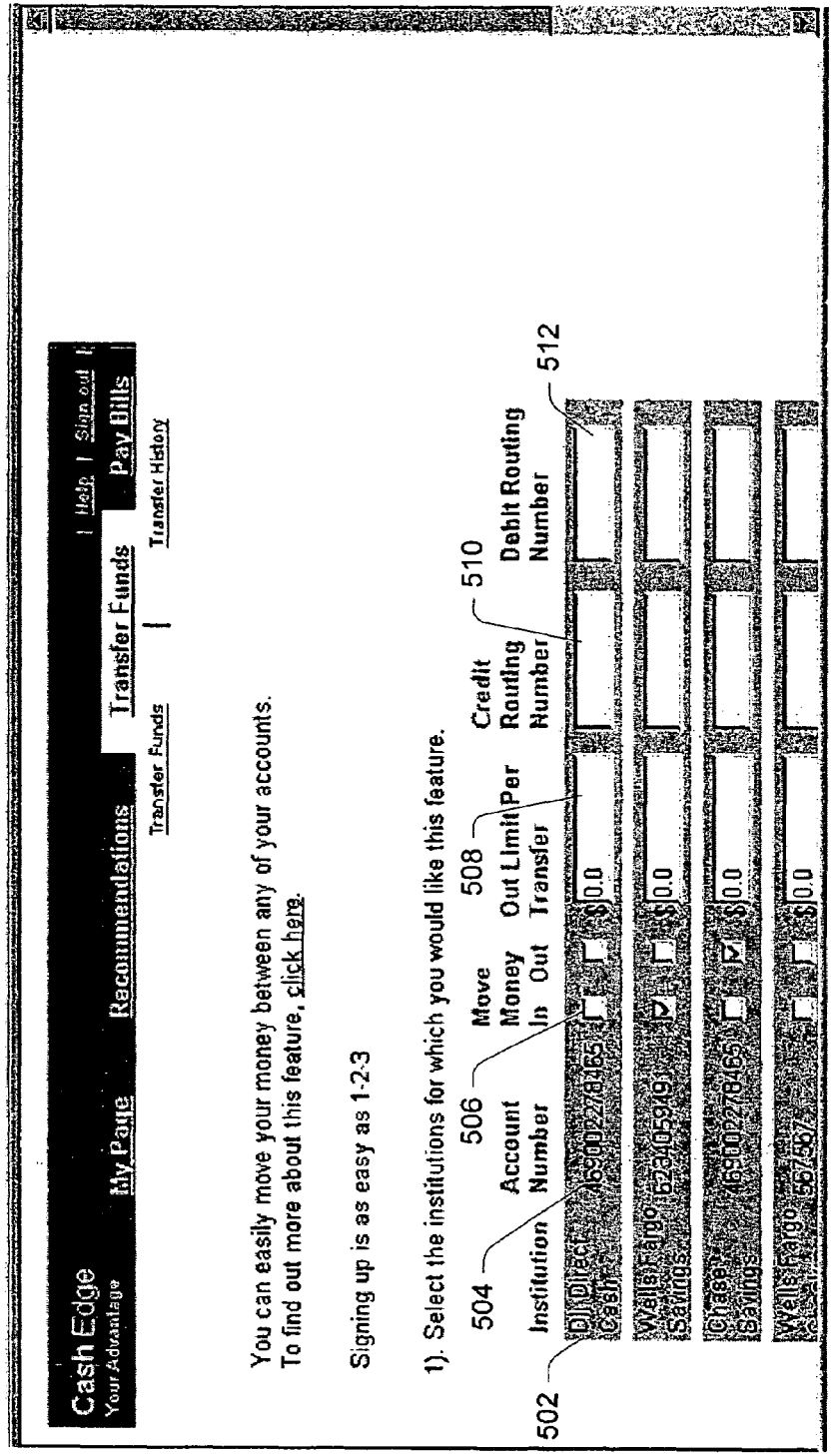
FIGS. 14-15 illustrate exemplary user interface screens illustrating various account entry fields and account recommendations.
Figure 15:
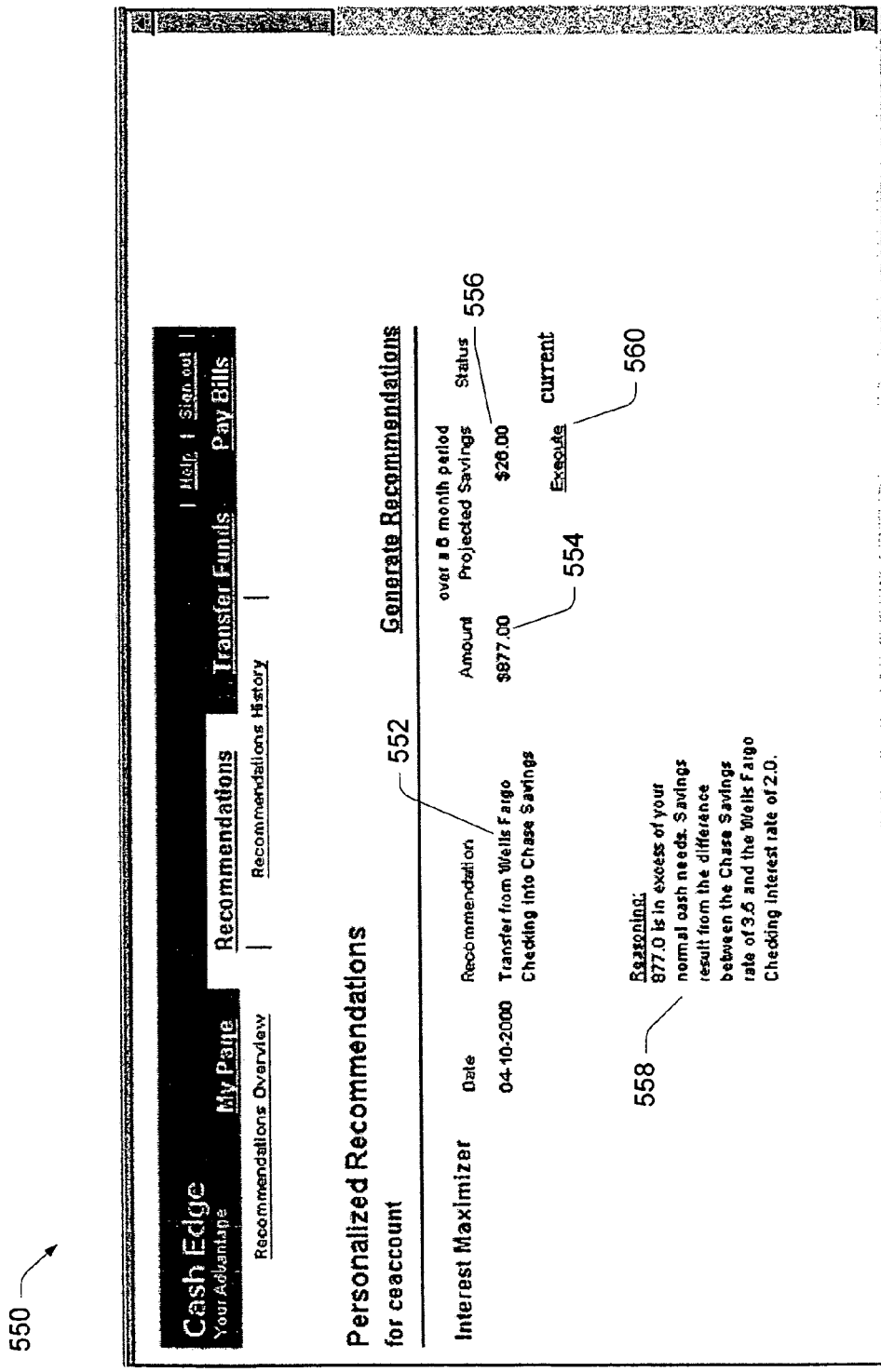

FIGS. 14-15 illustrate exemplary user interface screens illustrating various account entry fields and account recommendations. FIG. 14 illustrates an example screen 500 generated by a web browser or other application that allows a user to enter account information and preferences. Each entry identifies an institution 502 associated with the account and an account number 504. The user may select whether the financial management system has access to move funds into the account, out of the account, or both, by selecting the appropriate check boxes 506. The user may also set a maximum amount that can be withdrawn from the account at a particular time or during a particular time period by entering the amount in field 508. The credit routing number for the account is entered in field 510 and the debit routing number for the account is entered in field 512.

Although not shown in FIG. 14, other fields may be provided in the user interface to allow the user to enter additional preferences or information, such as interest rate, minimum balance the user wants maintained, etc. Certain account information (such as interest rate and routing numbers) may be obtained from the bank directly, thereby minimizing the information required to be entered by the user.

FIG. 15 illustrates another example screen 550 generated by a web browser or other application that allows a user to review recommendations generated by the financial management system. In the example of FIG. 15, one recommendation 552 is shown—to transfer funds from the Wells Fargo Checking account into the Chase Savings account. A recommended amount to transfer 554 has also been identified. If the recommendation is executed, the projected savings 556 over the next six months is $26. The reasoning or analysis supporting the recommendation and the projected savings is provided at 558. The user can execute the recommendation by activating the "Execute" button 560 on the screen. After activating the "Execute" button, the financial management system automatically performs the necessary steps to transfer the recommended funds between the two accounts.

In an alternate embodiment, the user is given the option to modify the amount to be transferred between the two accounts. For example, the user may only want to transfer $500 instead of the recommended $877. In this situation, the financial management system is still able to automatically perform the steps necessary to transfer $500 between the two accounts.

Figure 16:
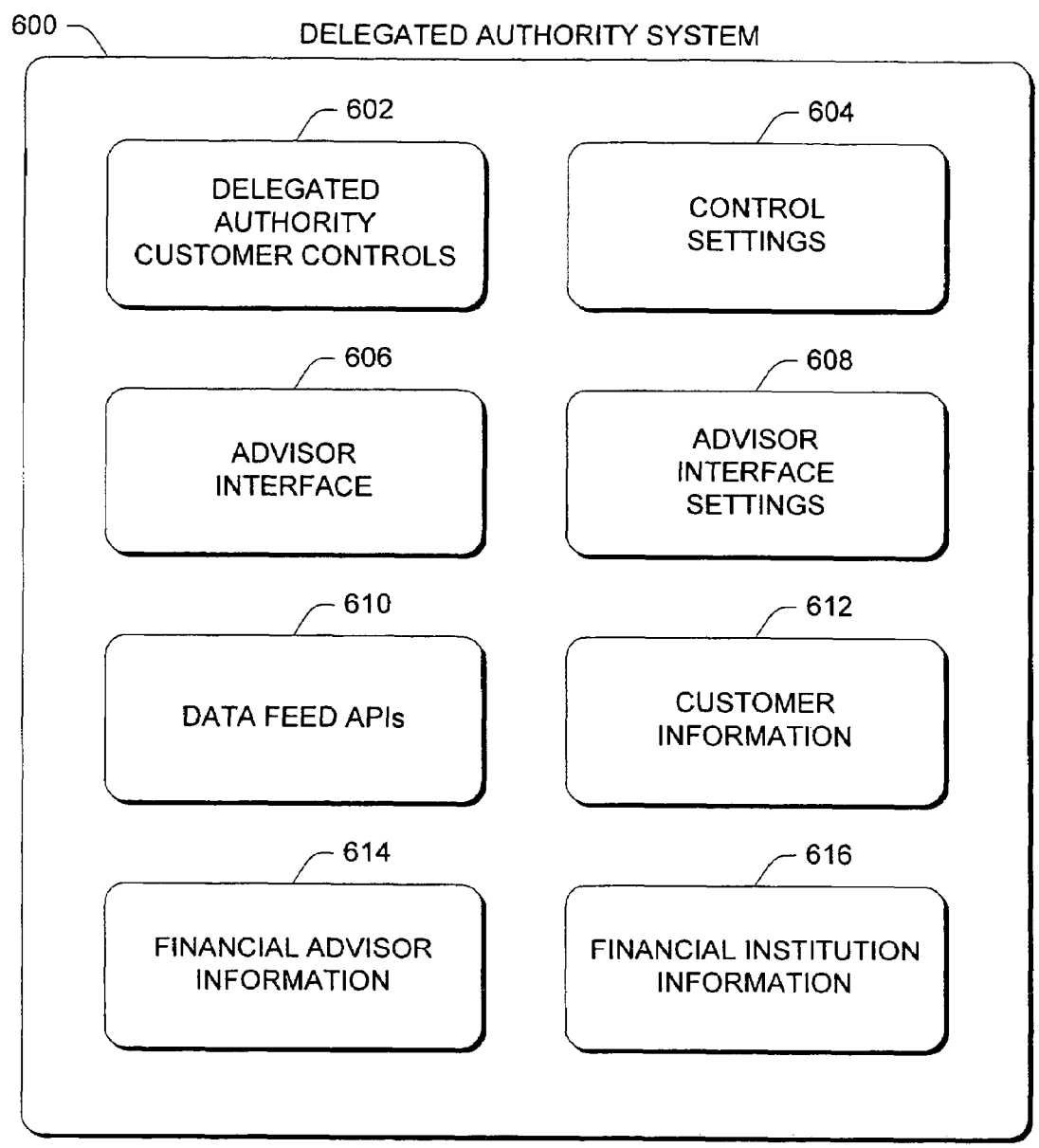
FIG. 16 is a block diagram showing exemplary components, modules, and data of a delegated authority system.

FIG. 16 is a block diagram showing exemplary components, modules, and data of a delegated authority system 600. A customer may delegate financial authority to one or more individuals, such as financial advisors, to access various accounts at one or more financial institutions. Alternatively, a customer may delegate financial authority to one or more individuals to access account data aggregated from the customer's various financial accounts. As discussed below, different advisors may receive different authority depending on the needs of the advisors and the customer's willingness to delegate financial authority to a particular advisor. For example, one advisor may be permitted to access all financial data while another advisor may be restricted to viewing summary account information. Delegated authority system 600 may be contained in a financial management system (e.g., financial management system 118 in FIG. 1), or any other system that is capable of being accessed by customers and financial advisors. In a particular embodiment, the delegation services discussed herein are offered by a third party that is accessible via the Internet or other data communication network.

The delegated authority system 600 includes delegated authority customer controls 602, which allows a customer to identify financial advisors and delegate specific financial authority to those advisors. The financial authority delegated to each financial advisor is stored in a control settings file 604. These control settings 604 are accessed prior to allowing a financial advisor to access a customer account. An advisor interface 606 allows financial advisors to manage and view financial data from one or more clients, generate reports, generate alerts based on client data, and communicate with clients via a message board and/or via email. Advisor interface settings 608 define various information established by an advisor, such as client list, one or more predefined view formats for viewing client data and one or more predefined report formats for generating reports based on client data. Additional details regarding the advisor interface 606 are provided below.

Data feed APIs 610 enable advisors to import or export a customer's financial data for use with other applications, such as the advisor interface 606. Customer information 612 identifies information related to customers that have accessed the delegated authority system 600. This information includes, for example, customer name and address, customer account information, and the like. Customer information 612 may also include information regarding a user's various accounts at one or more financial institutions. Additionally, customer information 612 may include information regarding the customer's non-liquid assets such as boats, cars, or houses. This information is provided to an authorized advisor to use in determining a client's net worth or when performing other financial calculations or evaluations.

Financial advisor information 614 identifies information related to advisors that have been identified by a customer and/or have registered with the delegated authority system 600. This information may include the advisor's name and address, customers with which the advisor has received delegated financial authority, etc. Financial institution information 616 identifies information related to one or more financial institutions. The financial institution information 616 may include ABA number and routing number, online access information, communication protocols, etc.

Figure 17:
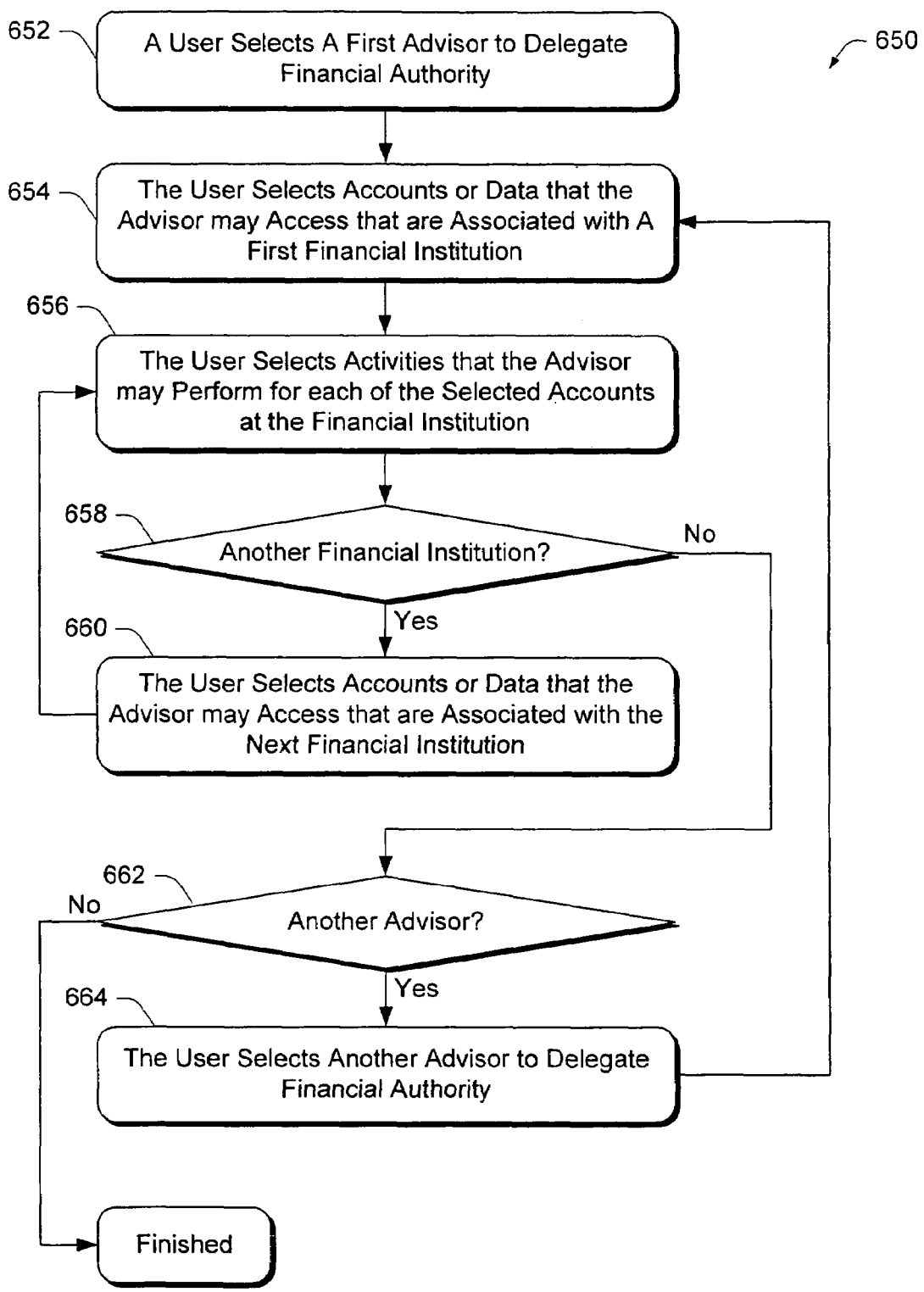
FIG. 17 is a flow diagram illustrating a procedure for delegating financial authority to one or more advisors.

FIG. 17 is a flow diagram illustrating a procedure 650 for delegating financial authority to one or more advisors. Initially, a user (e.g., a customer) selects a first advisor to delegate financial authority (block 652). The user'selects accounts or data that the advisor may access that are associated with a first financial institution (block 654). For example, the advisor may be permitted to access savings account information and checking account information, but not credit card account information. As mentioned above, the advisor may be permitted to retrieve information from the user's individual accounts or the advisor may be granted access to retrieve aggregated data collected from some or all of the user's accounts.

The user then selects activities or functions that the advisor may perform for each of the selected accounts at the financial institution (block 656). For example, the advisor may be permitted to access account data (at different levels of detail), but is not permitted to withdraw, deposit, or transfer funds. Additionally, the user determines whether the advisor is restricted to viewing summary information or whether the advisor is also able to view data associated with individual transactions, such as individual stock purchases or sales, or individual deposits and withdrawals.

A user can change the settings associated with a particular advisor or group of advisors at any time. Thus, a user can delegate authority to a new advisor, withdraw rights from a particular advisor or grant additional rights to a particular advisor at any time. In a particular embodiment, these changes are enacted through a third party service that is accessible via the Internet or other data communication network.

After selecting accounts and activities associated with the first financial institution, the procedure 650 determines whether there are additional financial institutions with which the user has an account (block 658). If there are additional financial institutions, the user selects accounts or data that the advisor may access that are associated with the next financial institution (block 660). The procedure then returns to block 656, where the user selects activities that the advisor may perform for each of the selected accounts at the next financial institution.

After all financial institutions have been configured by the user, the procedure branches to block 662 to determine whether the user wants to delegate financial authority to another advisor. If so, the user selects or identifies another advisor to delegate financial authority (block 664) and the procedure returns to block 654, where the user selects accounts or data that the advisor may access that are associated with a first financial institution. The procedure continues until the user has delegated financial authority to all desired advisors.

In the procedure 650 illustrated in FIG. 17, the user selects accounts/data and activities to be associated with each advisor to which financial authority is delegated. In alternate embodiments, a particular account (or collection of data) or a particular activity may have the same settings for all advisors. In this embodiment, the user can set the parameters once and have those same parameters applied to all advisors. The user is still able to change the settings in the future and use individual settings for different accounts or activities.

When a customer selects a particular advisor, the customer specifies the advisor name, email address, and a secret code. The customer communicates this secret code to the advisor, thereby allowing the advisor to access the customer's accounts through the delegated authority system. Before an advisor can utilize the delegated authority system, the advisor must register with the delegated authority system. Advisors that have been identified by a customer receive an email message that includes a link (e.g., a uniform resource locator (URL)) to a login page. New advisors may be required to complete a registration form that contains information regarding the advisor, such as name, mailing address, email address, login information, financial certifications, etc.

Alternatively, a particular financial institution may have a dedicated group of financial advisors from which the customer selects an advisor. For example, the user may be presented with a list of advisors and asked to select one of the advisors to work with the customer. The list may include information about each advisor, such as their experience level, areas of specialization, etc. In certain situations, an advisor may be selected for the customer by the financial institution based on the anticipated needs of the customers and the proficiencies and/or availability of the advisors.

Figure 18:
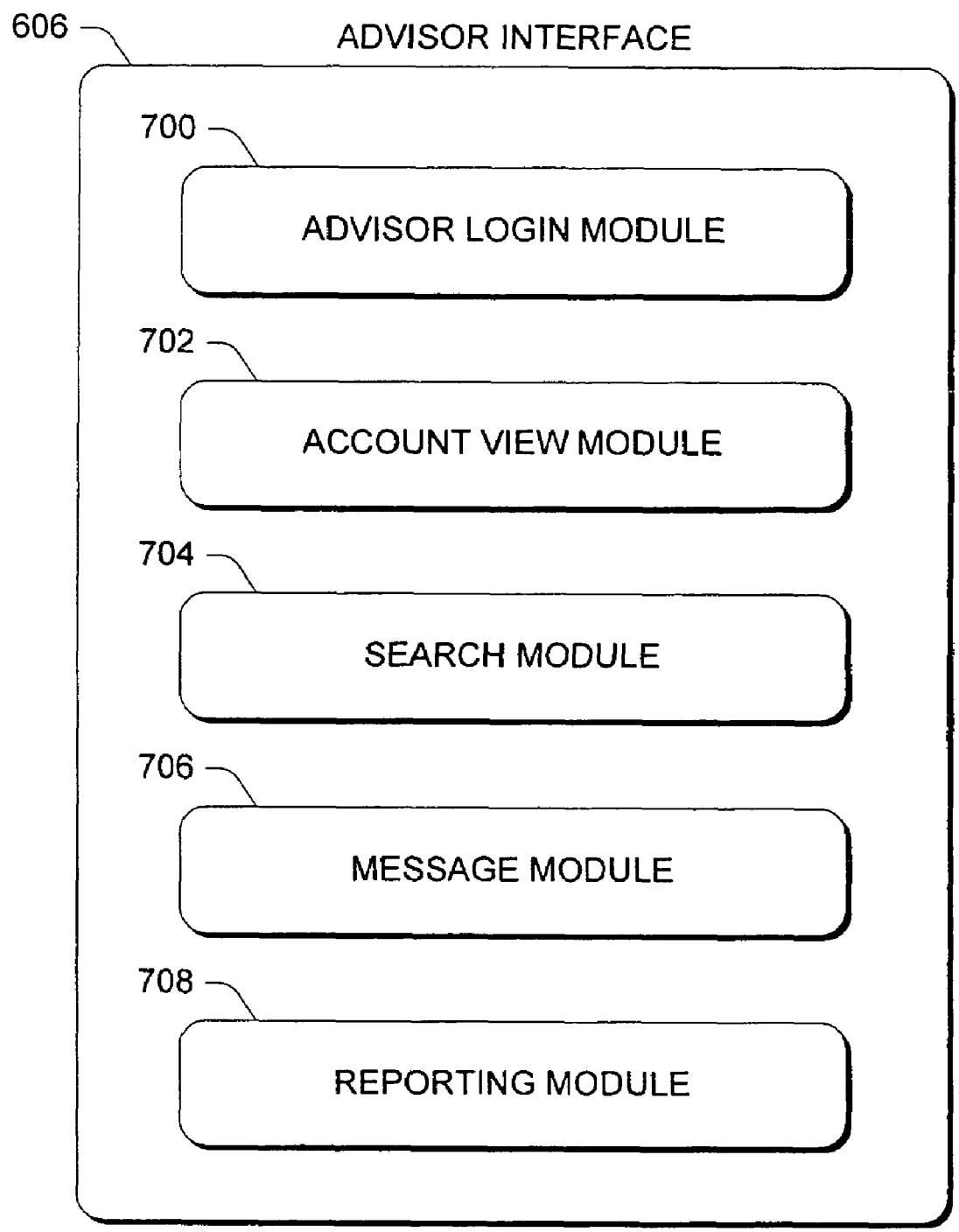
FIG. 18 is a block diagram showing exemplary components and modules of an advisor interface.

FIG. 18 is a block diagram showing exemplary components and modules of advisor interface 606. An advisor login module 700 collects login information from an advisor and verifies their permission to access the delegated authority system. An account view module 702 provides a consolidated view of all accounts for a particular client or for all clients of a particular advisor. The view module 702 can display aggregated financial data collected from multiple accounts at multiple financial institutions. A search module 704 may search through client accounts to identify common information (e.g., common equities owned by multiple clients) and more effectively manage clients.

In a particular example, an advisor uses the above modules 700-704 (as well as the modules discussed below) as the advisor's client management system. These modules allow the advisor to, for example, analyze client portfolios and keep track of assets under management, fees collected by the advisor based on the assets under management, and determine what type of new client development might be beneficial to the advisor. The modules also allow the advisor to automate client communication based on events across the portfolio. For example, the advisor may establish an email alert procedure that sends an email message to all clients in the advisor's portfolio that own a particular security if that security changes by more than ten percent. Thus, rather than creating a separate procedure for each client that owns the same security, a single procedure can generate the email message for all of the advisor's clients owning that security.

A message module 706 provides a messaging tool that enables advisors to communicate with clients via message boards and/or email. The message module 706 operates in conjunction with the search module 704 to communicate messages to all clients that share a common financial situation (e.g., all clients that own a particular equity, or all clients that have accounts at a particular financial institution). A reporting module 708 generates various reports based on the accounts of one or more clients. For example, reporting module 708 can generate a report identifying the consolidated equity holdings of all clients.

The delegated authority system described herein provides an improved mechanism for a financial advisor or other individual to collect information regarding a client's financial situation. The client's account information can be collected directly from the financial institutions, thereby providing account information that is current, rather than several days or several weeks old. Additionally, the financial advisor can view all account information from multiple financial institutions simultaneously to get a better understanding of the client's financial situation.

The delegated authority system described herein can be used in combination with a system that aggregate's data from multiple accounts at multiple financial institutions. However, alternate embodiments of the delegated authority system can be implemented without such a data aggregation system.

An example data aggregation system collects financial data from various financial institutions using direct data feeds, XML exchange, data harvesting scripts, and/or other data extraction/data acquisition routines. The collected data is normalized and stored in a database using a standard format. Certain data may be collected by analyzing and/or capturing various web pages. Data is extracted from the web pages, normalized, and stored in the database. Personal or confidential information may be deleted from captured web pages before storing the web page data.

Figure 19:
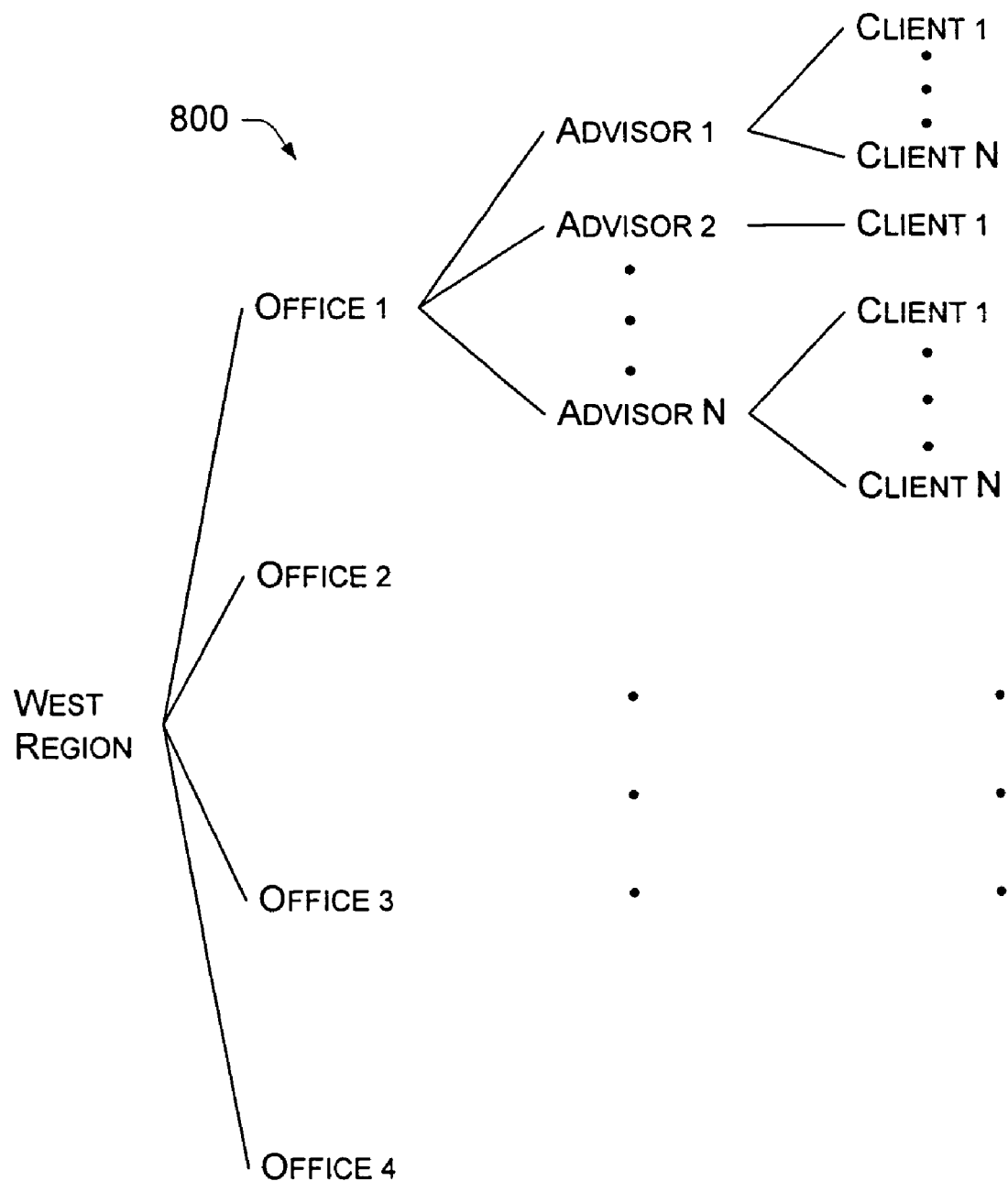
FIG. 19 illustrates a hierarchy of multiple clients, multiple advisors, and multiple advisor affiliations.

FIG. 19 illustrates a hierarchy 800 of multiple clients, multiple advisors, and multiple advisor affiliations. The hierarchy 800 represents all offices in the West Region of an organization (such as a financial services provider), advisors associated with those offices, and account holders associated with those advisors. In this example, the West Region has four offices, each of which has multiple advisors. Although advisors and associated account holders are only shown for Office 1 in FIG. 19, all offices may contain similar advisor-account holder relationships. Each advisor typically works with multiple clients, although a new advisor may start with one or two clients.

The hierarchy 800 allows individual advisors to collect data associated with all of the advisor's clients. This collected data may include the aggregated financial data associated with each of the advisor's clients. Similarly, a particular office can collect data from all advisors, thereby resulting in a collection of data from all clients associated with any of the office's advisors. Further, a particular region of the organization can collect data from all offices in the region, resulting in a collection of data from all clients associated with any of the advisors in any of the offices in the particular region. The organization can then collect data from all regions, thereby resulting in a collection of data from all clients associated with any part of the organization.

Figure 20:
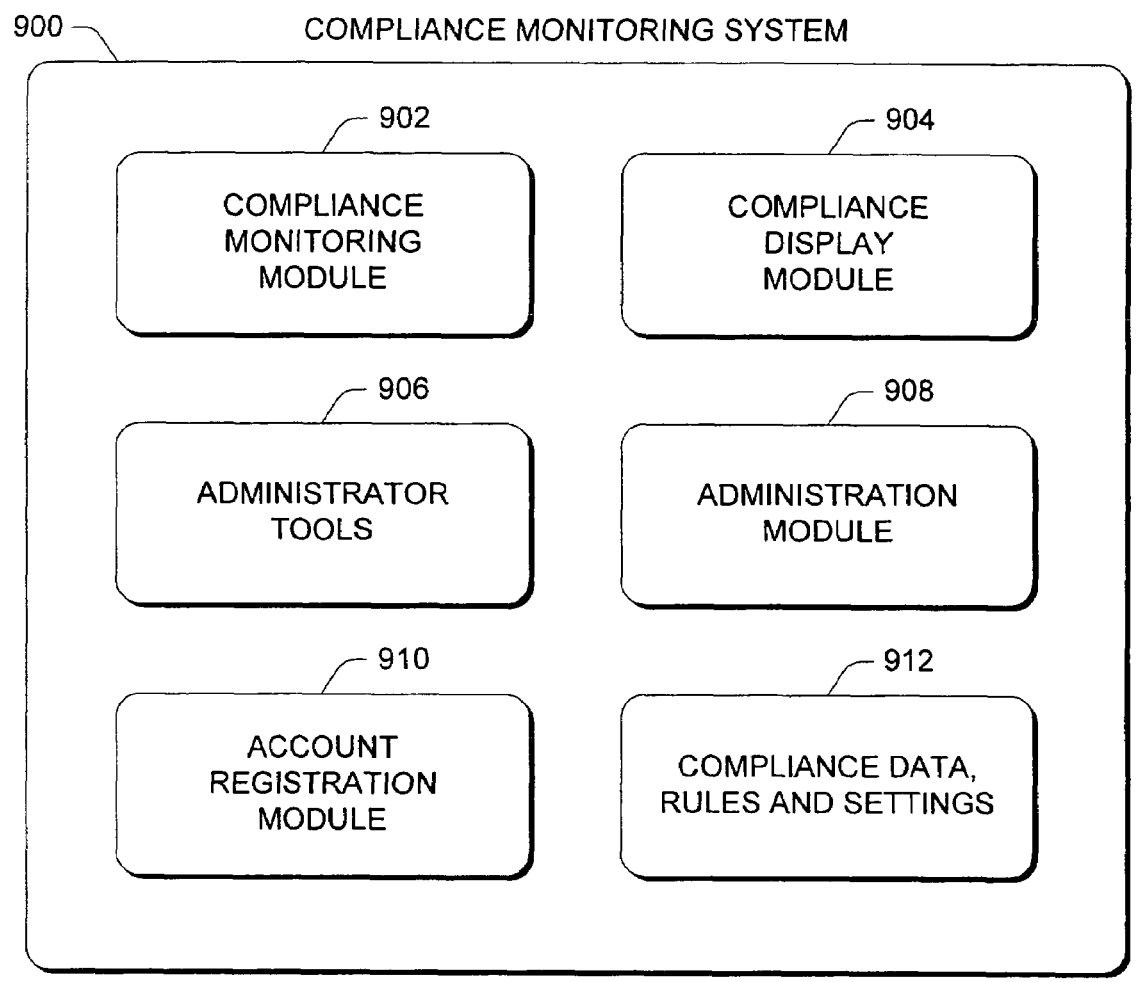
FIG. 20 is a block diagram showing exemplary components, modules, and data contained in a compliance monitoring system.

FIG. 20 is a block diagram showing exemplary components, modules, and data contained in a compliance monitoring system 900. Compliance monitoring system 900 automates various compliance functions related to, for example, employee or customer usage of third party investment accounts. These functions can include reviewing and screening investment accounts (e.g., account balances, investment positions, and transactions), automated workflow for handling employee requests to open new investment accounts, and automated creation and storage of employee investment reports. The examples discussed herein relate to monitoring employee usage of third party investment accounts. However, the systems and methods described herein can be used to monitor compliance of any individual, group of individuals, entity, group of entities, system, and the like.

Compliance monitoring system 900 includes a compliance monitoring module 902, a compliance display module 904, administrator tools 906, an administration module 908, an account registration module 910, as well as various compliance data, rules and settings 912. Compliance monitoring module 902 enables a user (such as a compliance administrator) to monitor employee registration, review search criteria, view aggregated employee account data, manage employee requests, and monitor employee investment reports. Compliance monitoring module 902 interacts with the other modules in compliance monitoring system 900 as well as other systems (e.g., third party systems) that contain employee account information or other data used by the compliance monitoring system.

Compliance display module 904 generates various information for display to a user, such as a compliance administrator. The information displayed may identify an employee's account information and account activities, report data based on one or more employees' account activities, or identify various other information. Administrator tools 906 enable a corporate compliance officer (or other individual) to define the screening criteria used in monitoring compliance of employees, such as trades in specific securities, trades in excess of certain dollar amounts, trades of large share quantities, and comparing the personal trades of an investment advisor with trades executed on behalf of the advisor's client. Administration module 908 enables a corporate compliance officer to manage one or more compliance administrators and assign (or reassign) employees between the compliance administrators. For example, a particular compliance administrator may be responsible for monitoring compliance of employees in a certain group or department within an organization.

Account registration module 910 enables an employee to register with the compliance monitoring system 900, identify existing third party investment accounts, submit employee requests to open new third party investment accounts or execute trades within an account, and process employee investment reports. Compliance data, rules and settings 912 include various information generated by and used by compliance monitoring system 900. This information includes, for example, account registration rules, account trading rules, screening criteria, compliance reports, automated search settings, and the like.

In a particular embodiment, compliance monitoring system 900 interacts with a financial management system, such as financial management system 220 discussed herein. In this embodiment, the financial management system may generate a particular recommendation (e.g., transfer assets, sell a security, or purchase a security). Prior to implementing this recommendation or communicating the recommendation to a user, the financial management system communicates with the compliance monitoring system to determine whether the recommendation is authorized (e.g., in compliance with one or more rules or regulations). The compliance monitoring system analyzes the recommendation based on the accounts involved, financial entities involved, individuals involved, etc. If the compliance monitoring system indicates that the recommendation is authorized, the financial management system proceeds with implementing the recommendation or communicating the recommendation to the appropriate individuals and/or entities. If the recommendation is not authorized by the compliance monitoring system, the financial management system discards the recommendation.

Figure 21:
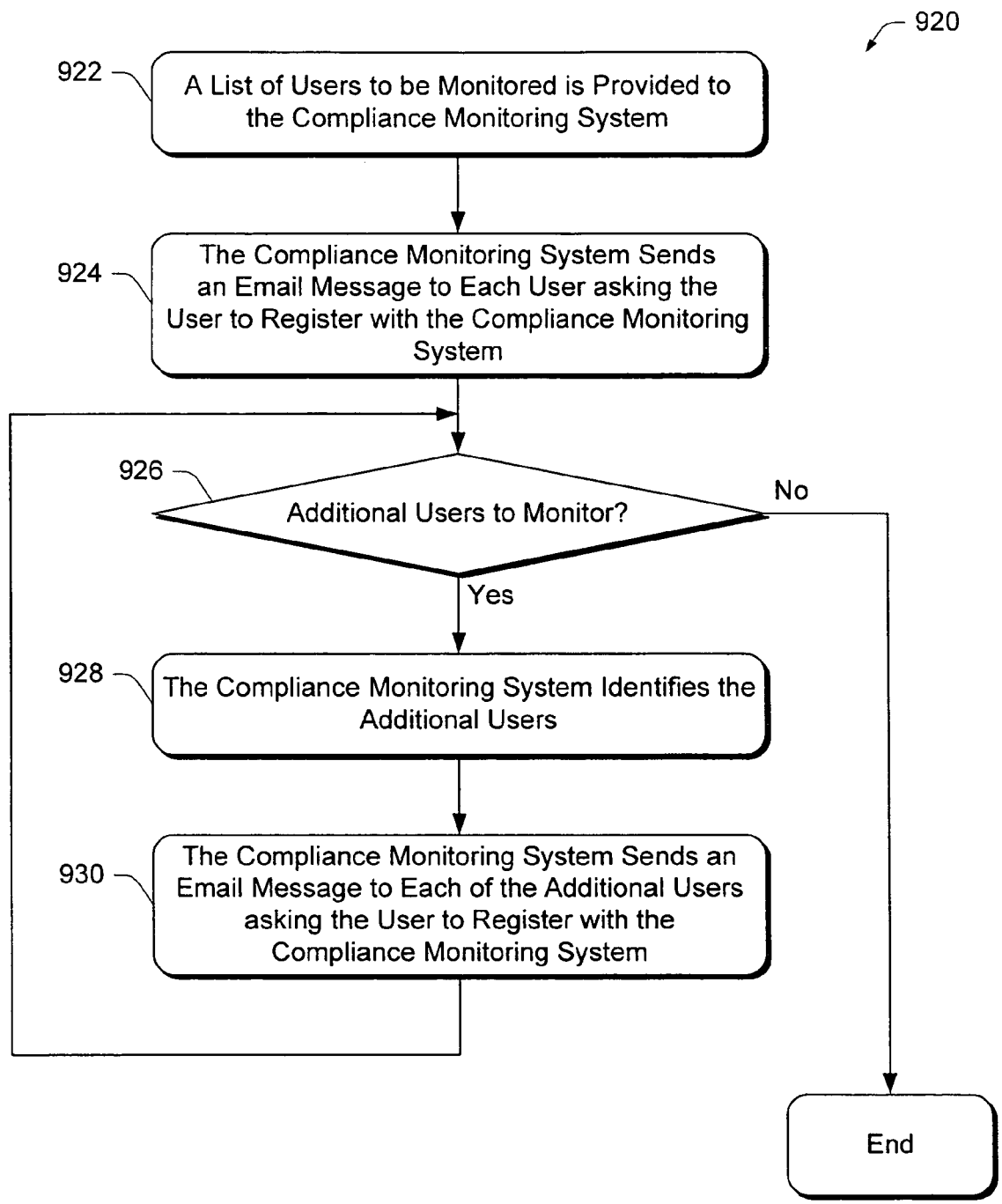
FIG. 21 is a flow diagram illustrating a procedure for configuring a compliance monitoring system to monitor multiple employees.

FIG. 21 is a flow diagram illustrating a procedure 920 for configuring a compliance monitoring system to monitor multiple employees. Initially, a list of employees to be monitored is provided to the compliance monitoring system (block 922). The compliance monitoring system then sends an email message to each listed employee asking the employee to register with the compliance monitoring system (block 924). The email message may include instructions for registering with the compliance monitoring system. A follow-up email message may be automatically generated for each employee that has not registered with the compliance monitoring system within a predetermined number of days after sending the initial email message.

Procedure 920 then determines whether there are additional employees to monitor (block 926). If so, the compliance monitoring system identifies the additional employees (block 928). The compliance monitoring system then sends an email message to each of the additional employees asking the employee to register with the compliance monitoring system (block 930). Procedure 920 periodically checks for additional employees to monitor (e.g., new employees, changes in monitoring guidelines or requirements, etc.).

Figure 22:
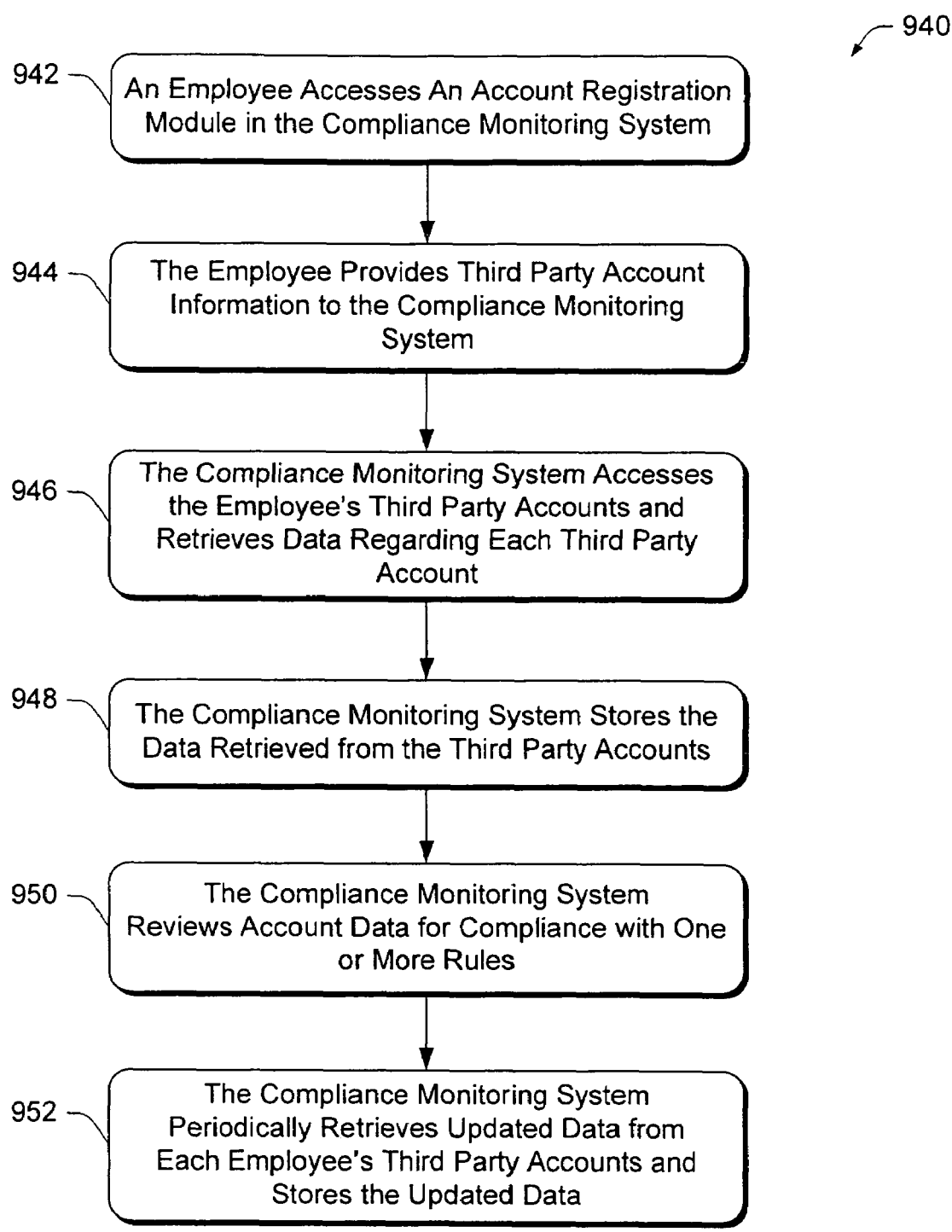
FIG. 22 is a flow diagram illustrating a procedure for obtaining information from one or more user accounts into a compliance monitoring system.

FIG. 22 is a flow diagram illustrating a procedure 940 for obtaining information from one or more user accounts, such as employee accounts, into the compliance monitoring system. Using this procedure, employees are able to delegate authority to their employer, thereby allowing the employer to review the employee's third party accounts. Initially, an employee accesses an account registration module in the compliance monitoring system (block 942). The employee then provides third party account information to the compliance monitoring system via the account registration module (block 944). This information includes, for example, the financial institution, the account type, and login credentials for the account. The compliance monitoring system then accesses the employee's third party accounts and retrieves data regarding each third party account (block 946). For example, the compliance monitoring system may login to the employee's account at a financial institution using an online account access feature. The employee will have provided a username and password for using this online account access feature. The compliance monitoring system then identifies the accounts being monitored and retrieves account information from those accounts through an online connection established with the financial institution. Account information can be retrieved, for example, using data harvesting (e.g., screen scraping) techniques, direct data downloads, or uploading shared data files.

The compliance monitoring system then stores the data retrieved from the third party accounts (block 948). This stored data may be reviewed by a compliance administrator, included in one or more compliance reports, or analyzed by an automated compliance procedure by applying one or more rules (block 950). The compliance monitoring system periodically retrieves updated data from each employee's third party accounts and stores the updated data (block 952).

Various rules may be applied to account data to ensure compliance with, for example, securities regulations, corporation rules or guidelines, and the like. Data from multiple accounts may be considered collectively when applying one or more rules. Different types of rules may be applied to account data. For example, accounts may be in compliance if they comply with any of several rules. Alternatively, accounts may be non-compliant if they fail to comply with any one of several rules. In another embodiment, several groups of rules may need to be satisfied. For example, accounts must comply with Rule A or Rule B, and comply with Rule C or Rule D. Various other combinations of rules may be applied to account data. A particular rule may include one or more sub-rules. For example, Rule A may be defined as "Rule B and NOT Rule C". Alternate rules may include any number of rules arranged in a hierarchical manner.

FIG. 23 illustrates an example display of data related to a particular employee being monitored. This example displays an overview of the employee's third party accounts. For example, the positions held by the employee are shown along with the corresponding number of shares owned and the current value of those shares. Additionally, the time that the displayed data was last updated is provided for each position.

FIG. 24 illustrates a more detailed display of data related to a particular employee being monitored. This example displays more information about the employee's various positions, such as the current price of each position and the currency in which the position is traded. FIG. 24 also shows the history of transactions between two dates. The details associated with each transaction are displayed below the identified range of dates.

FIG. 25 illustrates an example display of data related to the status of various searches performed on the accounts of one or more employees. Each of the pre-defined searches shown in FIG. 25 can be executed by activating (e.g., "clicking" with a mouse or other pointer) a "Run Now" selection associated with the desired pre-defined search. The "Status" column identifies the result of the last execution of the pre-defined search and the "Last Executed" column identifies the last day and time that each of the pre-defined searches was executed. The available pre-defined searches may be defined using one or more administrator tools.

FIG. 26 illustrates an example display of data related to employee account information that was flagged during monitoring of one or more employee accounts or during execution of a search (such as a pre-defined search). In this example, the results shown are associated with a search titled "Purchase or sale of a security over $25,000". An email alert can be generated by activating an "Email Alert" selection associated with each displayed result. For example, an email alert can be send to a compliance officer responsible for monitoring employee accounts. Additionally, a comment can be entered by activating the "Insert Comment" selection associated with each displayed result.

The compliance monitoring system is capable of receiving lists of employees and other information from one or more organizations. Thus, a single compliance monitoring system may provide monitoring services to multiple different organizations. These organizations may pay a fee for the monitoring services performed by the compliance monitoring system. Alternatively, the compliance monitoring system may be owned by or dedicated to serving a single organization.

A reporting page may be generated by any compliance administrator. This display contains summary information regarding flagged items (e.g., items flagged during one or more searches as being out of range or otherwise meeting certain search criteria) and a link to view the detailed search results for each search criteria. Such information may include employee name, employee identifier (including relevant financial institution parameters such as office location), employee contact information, financial institution, account type/name, actual value for the criteria being searched, the number of current and historical "violations", and a link to view the employee's specific account detail page.

In a particular embodiment, a compliance administrator is notified by email whenever a pre-defined search registers a flagged value. The email message may be specific to the search criteria flagged and alerts the compliance administrator to log into the compliance monitoring system and check the search results page. Email alerts may be sent to any compliance administrator that is eligible to see the account information of an employee with flagged data.

When a pre-defined search registers a flagged value, certain information is stored for future reference. This information includes the criterion violated, date of the violation, employee name, employee ID number, financial institution account, comments and any follow-up action taken by a compliance administrator, and other parameters, such as the department or group with which the employee is associated.

As discussed above, a compliance administrator (or other individual) can define a set of searches that are executed against the employee data at pre-defined frequencies. Once a search (or set of searches) has been defined, it is made available for use by all compliance administrators. A particular search may include any number of search criteria that can be set by the compliance administrator executing a search. Certain search criteria may have default values that can be modified by the compliance administrator.

Additional search criteria can be defined for any financial data stored by the compliance monitoring system. For example, account balance values can be selected for above/below thresholds, and date values can be selected for before/after thresholds. Additionally, transactions can be screened by type, dollar value, commission amount, quantity, etc. Accounts can be screened by account type, financial institution, account attributes, and the like.

An employee can request specific activities, such as approval to open a new investment account and approval of trade requests. For example, a request to open a new investment account may include the name of the financial institution, contact information and mailing address for the financial institution, and an email address for contacting the financial institution. Submission of such requests launches an automated process that generates the required form letters (if needed), manages the approval process, tracks the progress of the request, and records audit trail information for each step in the process. Status reports can be generated that identify summary information and the specific status for each request.

When a compliance administrator receives notification that a new request is pending, they can review the submitted data at their convenience. If all relevant data is included with the request, the compliance administrator can create and print a form letter, and send the form letter to the financial institution. Relevant milestones are then recorded in the compliance monitoring system. When the financial institution responds to the letter, the compliance administrator can retrieve the request, edit the request as needed, and generate an approval or denial of the request. The approval or denial can be communicated to the employee via email.

When an employee submits a request to execute a trade, the request is compared to a list of prohibited securities or prohibited transactions. An automated response can be generated (e.g., an email message) approving or denying the requested trade. A compliance administrator receives notification of the trade request and can review the result of the request. The compliance administrator is able to override the results generated by the automated response, e.g., allow a previously denied request or deny a previously allowed request.

The compliance monitoring system allows an organization to manage one or more compliance administrators that access the compliance monitoring system. For example, employees may be reassigned to different compliance administrators and the status of compliance administrators can be modified between active and inactive states.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A computer implemented method comprising:
    electronically storing compliance data, rules and settings, comprising account registration rules, account trading rules, and screening criteria in a compliance monitoring system;
    identifying an individual to be monitored for account compliance; registering the individual with the compliance monitoring system;
    electronically receiving from the individual account information associated with the individual;
    electronically storing the received account information; generating at least one predetermined rule that applies to all monitored transactions requested by the individual, wherein generating comprises using the compliance data, rules and settings, and the account information associated with the individual:
    electronically obtaining holdings in the account; and
    electronically determining whether the holdings in the account comply with a predetermined rule of the at least one predetermined rules;
    automatically electronically retrieving updated account information from the account; and
    storing the updated account information.

2. A method as recited in claim 1 wherein obtaining holdings in the account is performed using the account information associated with the individual.

3. A method as recited in claim 1 further comprising:
    obtaining transactions associated with the account; and
    determining whether the transactions comply with the predetermined rule.

4. A method as recited in claim 1 wherein the predetermined rule is associated with a financial regulation.

5. A method as recited in claim 1 further comprising generating an alert message if the holdings in the account do not comply with the predetermined rule.

6. A method as recited in claim 1 further comprising generating an alert message if the holdings in the account do not comply with a plurality of rules that collectively determine account compliance.

7. A method as recited in claim 1 wherein obtaining holdings in the account includes accessing account data via an online communication link.

8. A method as recited in claim 1 wherein the account is a financial account with a third party.

9. A method as recited in claim 1 wherein the individual comprises an employee, a relative of an employee and a dependent of an employee.

10. A method as recited in claim 1 wherein the individual is subject to regulation of financial transactions by government agencies.

11. A computer implemented method comprising:
electronically storing compliance data, rules and settings, comprising account registration rules, account trading rules, and screening criteria in a compliance monitoring system;
electronically identifying an entity to be monitored for account compliance;
electronically registering the entity with a compliance monitoring system; receiving from the entity account information associated with the entity; storing the received account information;
electronically generating at least one predetermined rule that applies to all monitored transactions requested by the entity, wherein generating comprises using the individual;
electronically obtaining holdings in the account; and
electronically determining whether the holdings in the account comply with a predetermined rule of the at least one predetermined rules; and
electronically generating a compliance report comprising the information regarding whether the holdings comply with the predetermined rule.

12. A method as recited in claim 11 further comprising:
retrieving transactions associated with the account; and
determining whether the retrieved transactions comply with the predetermined rule.

13. A method as recited in claim 11 wherein the predetermined rule is associated with a financial regulation.

14. A method as recited in claim 11 wherein the entity is a financial institution.

15. A computer implemented method comprising:
electronically identifying a first employee to be monitored for account compliance;
electronically registering the first employee with a compliance monitoring system;
electronically identifying a second employee to be monitored for account compliance; registering the second employee with the compliance monitoring system;
electronically receiving from the first employee first account information associated with the first employee;
electronically receiving from the second employee second account information associated with the second employee;
electronically storing the received account information;
electronically generating at least one predetermined rule that applies to all monitored transactions requested by the individual, wherein generating comprises using the compliance data, rules and settings, and the account information associated with the individual;
electronically obtaining holdings in the first account and the second account; and
electronically determining whether the holdings in the first account and the second account comply with a predetermined rule of the at least one predetermined rules;
automatically electronically retrieving updated account information from the first account and the second account; and
storing the updated account information.

16. A method as recited in claim 15 further comprising storing information regarding the holdings in the first account and the second account.

17. A method as recited in claim 15 further comprising generating a report summarizing the holdings in the first account and the second account.

18. A method as recited in claim 15 further comprising generating an alert message if the holdings in the first account do not comply with the predetermined rule.

19. A method as recited in claim 15 further comprising generating an alert message if the holdings in the second account do not comply with the predetermined rule.

20. A method as recited in claim 15 wherein the first account is associated with a first financial institution and the second account is associated with a second financial institution.

21. A computer implemented method comprising:
electronically identifying an individual to be monitored for account compliance;
electronically registering the individual with a compliance monitoring system;
electronically receiving from the individual account information associated with the individual, wherein the account information is associated with accounts at a plurality of financial institutions;
electronically storing the received account information;
electronically generating at least one predetermined rule that applies to all monitored transactions requested by the individual, wherein generating comprises using the compliance data, rules and settings, and the account information associated with the individual;
electronically obtaining holdings in the accounts; and
electronically determining whether the holdings in the accounts fail to comply with at least one rule of the at least one predetermined rules;
automatically electronically retrieving updated account information from the account; and
storing the updated account information.

22. A method as recited in claim 21 wherein receiving account information includes harvesting data from the accounts.

23. A method as recited in claim 21 wherein receiving account information includes downloading account information from the plurality of financial institutions.

24. A computer implemented method comprising:
electronically storing compliance data, rules and settings, comprising account registration rules, account trading rules, and screening criteria in a compliance monitoring system;
electronically identifying an entity to which an account holder is to delegate access to data associated with the account holder;
electronically identifying data that the entity is permitted to access;
electronically identifying activities that the entity is permitted to perform, comprising
electronically determining whether activities comply with the compliance data, rules and settings; and
electronically storing the identity of the identified entity, the identified data, and the identified activities in a central location.

25. A method as recited in claim 24, wherein the central location is a server accessible via the Internet.

26. A method as recited in claim 24, wherein the data associated with the account holder is financial data collected from a plurality of accounts associated with the account holder.

27. A method as recited in claim 24, wherein the identified data is summary data associated with accounts associated with the account holder.

28. A method as recited in claim 24, wherein the identified data is transaction data associated with transactions in accounts associated with the account holder.

29. A method as recited in claim 24, wherein the identified data includes summary data associated with accounts associated with the account holder and transaction data associated with transactions in accounts associated with the account holder.

30. A method as recited in claim 24, wherein the account holder is an employee of the entity.

31. One or more computer-readable media having stored thereon a computer program that, when executed by one or more processors, causes the one or more processors to:
   electronically store compliance data, rules and settings, comprising account registration rules, account trading rules, and screening criteria in a compliance monitoring system;
   electronically identify an employee to be monitored for compliance;
   electronically register the employee with a compliance monitoring system;
   electronically receive account information associated with the employee;
   electronically store the received account information; generate at least one predetermined rule that applies to all monitored transactions requested by the employee, wherein generating comprises using the compliance data, rules and settings, and the account information associated with the employee;
   electronically identify transactions associated with the account; and
   electronically determine whether the transactions associated with the account comply with a predetermined rule of the at least one predetermined rules;
   electronically retrieve updated account information from the account; and
   store the updated account information.

32. One or more computer-readable media as recited in claim 31 wherein the one or more processors further:
   obtain holdings in the account; and
   determine whether the holdings in the account comply with the predetermined rule.

33. One or more computer-readable media as recited in claim 31 wherein the one or more processors further generate an alert message if the transactions associated with the account do not comply with the predetermined rule.

34. One or more computer-readable media as recited in claim 31 wherein the predetermined rule is associated with a securities regulation.

* * * * *